United States Patent Office 3,228,932
Patented Jan. 11, 1966

3,228,932
19-HALO CORTICOIDS
Albert Bowers, Mexico City, Mexico, assignor to Syntex Corporation, Panama, Panama, a corporation of Panama
No Drawing. Filed Dec. 6, 1963, Ser. No. 328,525
Claims priority, application Mexico, Mar. 9, 1962, 66,485
20 Claims. (Cl. 260—239.55)

The present application is a continuation-in-part of my U.S. patent application Serial No. 194,715, filed May 14, 1962, and 262,235 filed March 1, 1963, both applications now abandoned.

The present invention relates to novel cyclopentanophenanthrene compounds and to a process for the production thereof.

More particularly the present invention relates to 19-halo and 19-halo-10α derivatives of cortical hormones.

The novel compounds of the present invention are represented by the following formulas:

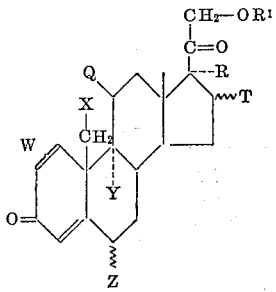

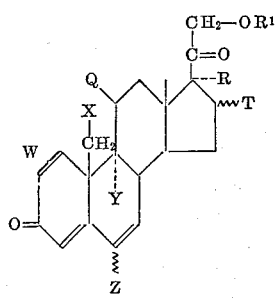

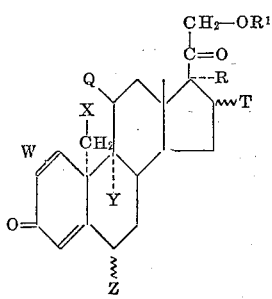

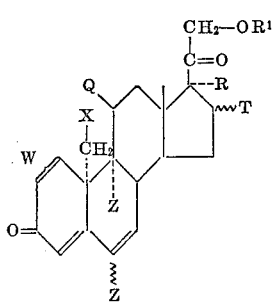

In the above formulas X represents fluorine or chlorine; W represents a double bond or a saturated linkage between C–1 and C–2; Z represents hydrogen, methyl, fluorine or chlorine, all having α or β configurations; Q represents a β-hydroxyl or a keto group; Y represents hydrogen, fluorine or chlorine; R represents a hydroxyl group; T represents hydrogen, α-hydroxy, α-acyloxy, α-methyl or β-methyl; T and R together represent the group

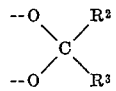

in the 16α,17α-positions, wherein $R^2$ and $R^3$ each represent hydrogen or a hydrocarbon residue of up to 8 carbon atoms of straight, branched, cyclic or mixed aliphatic cyclic chain, or aromatic, such as methyl, ethyl, isopropyl, phenyl, toluyl, methyl-cyclohexyl and the like; and $R^1$ represents hydrogen or a hydrocarbon carboxylic acyl group of less than 12 carbon atoms.

The acyl groups are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formulas are valuable cortical hormones with high-inflammatory, low catabolic, glycogenic and thymolytic activities. In addition, they are anti-androgenic, anti-gonodotrophic and anti-estrogenic hormones. Further-more, they have high topical activity in skin disorders such as psoriasis, allergic dermatitis and the like.

The novel compounds of the present invention are prepared by the process illustrated by the following formula scheme:

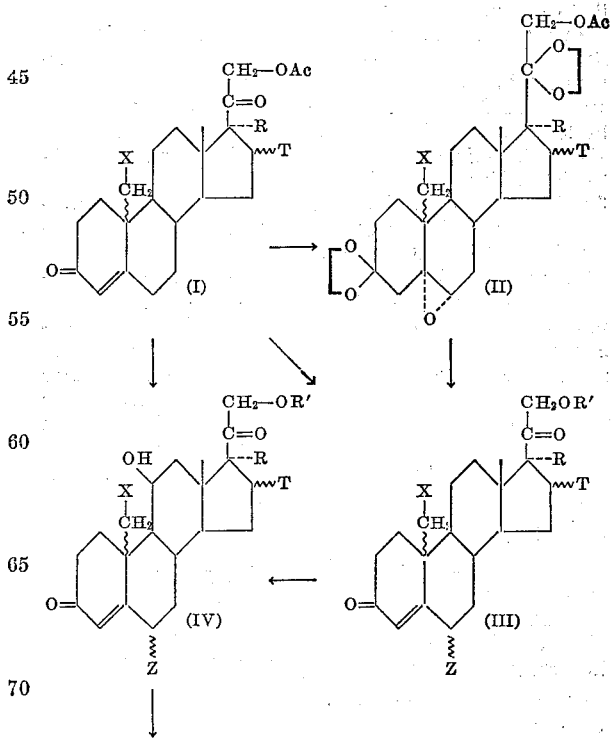

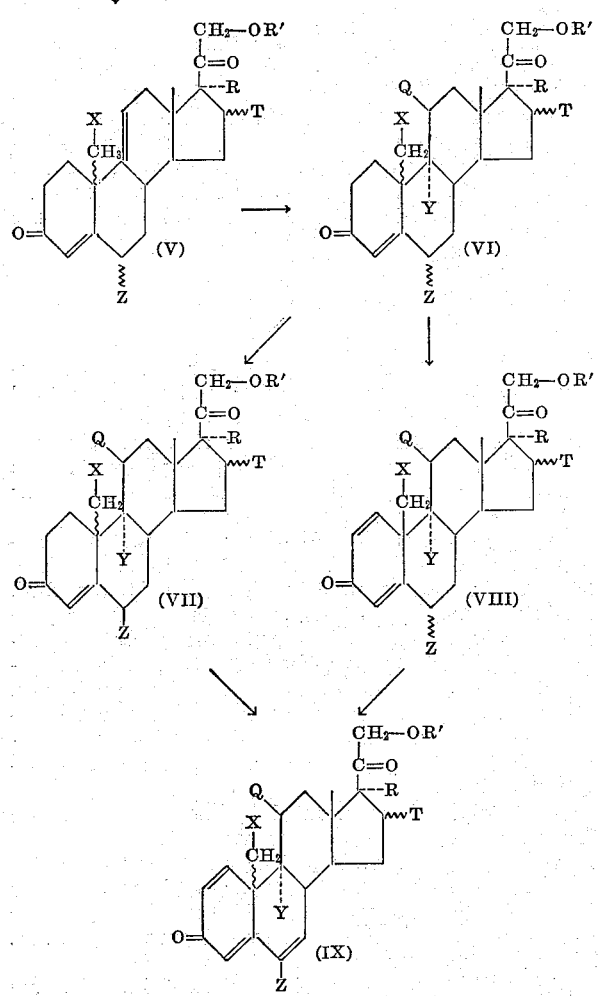

In the above formulas Q, X, Y, Z, R, R¹ and T have the same meaning as described hereinbefore, indicates that C–19 may have the α or β configurations.

In practicing the process of the present invention the starting 19-halo-Δ⁴-10α-pregnen-17α-ol-3,20-dione compound (obtained according to my copending U.S. Patent application Serial No. 328,474, filed December 6, 1963, by tosylation of the corresponding Δ⁴-10α-pregnene-17α, 19-diol-3,20-dione, and treatment of the resulting 19-tosylate with a lithium halide such as lithium chloride or fluoride) or the starting 19-halo-Δ⁴-pregnen-17α-ol-3,20-dione compound (obtained in accordance with my copending U.S. Pat. Appl. Ser. No. 194,714 filed May 14, 1962, now abandoned, by treating the corresponding 19-halo - Δ⁵ - pregnene - 3β,17α - diol - 20 - one 17 - acetate with aluminum isopropoxide in toluene-cyclohexanone solvent, followed by saponification with aqueous dimethanolic potassium hydroxide) is treated with iodine in the presence of calcium oxide to give the corresponding 21-iodo derivative which upon treatment with potassium acetate, in a suitable solvent, such as acetone, preferably at reflux temperature, affords the corresponding 21-acetoxy-19-halo-Δ⁴-pregnen-17α-ol-3,20-dione derivative (I). The latter 3,20-dione, upon reaction with ethylene glycol in the presence of p-toluensulfonic acid, yields the corresponding 3,20 - bis-cycloethylenedioxy - 19 - halo - Δ⁵-pregnene - 17α,21 - diol - 21 - acetate compound which is treated with an organic peracid, such as monoperphthalic acid, in an inert solvent, preferably chloroform to produce the corresponding 3,20-bis-cycloethylenedioxy-5α,6α-oxido-19-halo-pregnane-17α,21-diol 21 - acetate (II).

Upon reaction of the latter 3,20-bis-cycloethylenedioxy-5α,6α-oxido compound with methyl magnesium bromide in an inert solvent such as ether or tetrahydrofuran, followed by conventional working up and treatment of the residue with a mineral acid, such as 8% sulfuric acid, and thereafter with thionyl chloride in pyridine at about —10° C., for approximately 4 minutes, there is obtained the corresponding 19-halo-6β-methyl-Δ⁴-pregnene-17α, 21-diol-3,20-dione (III: Z=β-methyl; R¹=H). The latter 6β-methyl derivative is treated with an alkali metal hydroxide, such as sodium hydroxide, in a suitabe solvent, such as methanol, thus affording the corresponding 6α-methyl derivative (III: Z=α-methyl; R¹=H). When treating the 3,20-bis-cycloethylenedioxy-5α,6α-oxido compounds (II) with hydrogen chloride, in a suitable organic solvent, such as ethyl acetate, there are produced the corresponding 6α-chloro-19-halo-Δ⁴-pregnene-17α,21-diol-3,20-dione 21-acetate derivatives (III: Z=α-chlorine, R¹=acetyl).

Upon reaction of the 3,20-bis-cycloethylenedioxy-5α, 6α-oxido compounds (II) with anhydrous hydrogen fluoride, preferably in the presence of boron trifluoride etherate, followed by treatment with hydrogen chloride, there are produced the corresponding 6α-fluoro-19-halo-Δ⁴-pregnene - 17α,21 - diol - 3,20 - dione 21 - acetate derivatives (III: Z=α-fluorine; R¹=acetyl).

The 21 - acetoxy - 19 - halo - Δ⁴ - pregnen - 17α - ol-3,20-dione derivatives (I) are treated with ethyl orthoformate in the presence of p-toluenesulfonic acid, in an inert solvent, thus affording the corresponding 21-acetoxy - 19 - halo - 3 - ethoxy - Δ³,⁵ - pregnadien - 17α - ol-20-one derivatives which upon reaction with approximately 1-molar equivalent of N-chloro succinimide or another N-chloro amide or imide, in the presence of sodium acetate and acetic acid, yield the corresponding 6β-chloro-19 - halo - Δ⁴ - pregnene - 17α,21 - diol - 3,20 - dione 21-acetate derivatives (III: Z=β-chlorine; R¹=acetyl).

The aforesaid 21-acetoxy-19-halo-3-ethoxy-Δ³,⁵-pregnadien-17α-ol-20-one derivatives are treated with perchloryl fluoride in dimethyl formamide to produce the corresponding 6β-fluoro-19-halo-Δ⁴-pregnene-17α,21-diol-3,20-dione 21-acetate derivatives (III: Z=β-fluorine; R¹=acetyl).

The 6α-halo compounds of the present invention (III: Z=halogen) may also be obtained by treatment of the corresponding 6β-halo compounds (III: Z=β-halogen) with hydrogen chloride in acetic acid.

The 19 - halo - Δ⁴ - pregnene - 17α,21 - diol - 3,20-dione, derivatives mentioned heretofore (I, III) upon incubation with adrenal glands in a suitable medium, e.g. an aqueous solution of alkali metal phosphates and chlorides and in magnesium sulfate, mixed with an aqueous solution of fumaric acid and sodium hydroxide for a period of time of the order of 3 hours, at approximately 28–37° C., yield—the corresponding 19-halo-Δ⁴-pregnene-11β,17α,21-triol-3,20-dione derivatives (IV).

The latter 11β-ols (IV) are treated with mesyl chloride in dimethyl formamide and pyridine at approximately 80° C. for about half an hour, to produce the corresponding 19-halo-Δ⁴,⁹⁽¹¹⁾-pregnadiene-17α,21-diol-3,20-dione derivatives (V).

The last named Δ⁴,⁹⁽¹¹⁾-derivatives are treated with an N-bromoamide or imide, such as N-bromoacetamide, in the presence of perchloric acid, in an inert solvent, such as for example dioxane to give the corresponding Δ⁴-9α-bromo 11β-ols which upon treatment with a mild base, such as potassium acetate, in a suitable solvent, e.g. acetone, preferably at reflux temperature, afford the corresponding 19 - halo - 9β,11β - oxido - Δ⁴ - pregnene - 17α, 21-diol-3,20-dione compounds. The latter 9β,11β-oxido compounds, upon treatment with a hydrogen halide, such as hydrogen fluoride or hydrogen chloride in a suitable inert oganic solvent, e.g. methylene chloride or chloroform, yield the corresponding 9α-halo-19-halo-Δ⁴-pregnene-11β,17α,21-triol-3,20-dione derivatives (VI: Q=OH;

Y=halogen). The 11β-hydroxyl group of the latter compounds and of the 9α-unsubstituted 11β-ols (IV), after previous conventional protection of the 21-hydroxyl group as by esterification, is oxidized preferably with Jones' reagent (chromium trioxide in sulfuric acid), thus affording the corresponding 11-ketones (VI: Q=keto).

The 19-halo-Δ⁴-pregnene - 11β,17α,21 - triol-3,20-dione and 19-halo-Δ⁴-pregnene - 17α,21 - diol-3,11,20-trione derivatives (VI), upon reaction with chloranil in t-butanol at reflux temperature for approximately 8 hours, yields the corresponding Δ⁴,⁶-derivatives (VIII).

The 19-halo-Δ⁴-pregnene derivatives represented by Formula VI are treated with 2,3-dichloro-5,6-dicyano-1,4-benzoquinone, in a suitable solvent such as dioxane, preferably at reflux temperature for a period of time of the order of 10 hours, to produce the corresponding Δ¹,⁴-pregnadiene derivatives (VIII).

When treating the aforesaid Δ⁴,⁶- compounds (VII) with 2,3 - dichloro - 5,6 - dicyano-1,4-benzoquinone under the same conditions as described hereinbefore, there are obtained the corresponding Δ¹,⁴,⁶-pregnatriene derivatives (IX).

The compounds of the present invention having a 16α,17α-ketonide grouping, yield the corresponding 16α,17α-diols by conventional treatment with an acid, such as acetic acid. The obtained diols, upon conventional esterification in pyridine with an acylating agent, as for example acetic anhydride or caproic anhydride, afford the corresponding 16-acylates.

The latter 16α,17α-diols upon conventional condensation with a ketone or aldehyde, such as benzaldehyde acetophenone, methyl-ethyl ketone, acetone, acetaldehyde, and the like, in the presence of an acid, yield the corresponding 16α,17α-methylenedioxy derivatives, wherein the substituents in the methylenedioxy group may be different from those of the previously hydrolyzed ketonide grouping.

The compounds of the present invention having a 21-acyloxy group, are saponified by conventional treatment with a base to produce the corresponding 21-free alcohols which, in turn, may be acylated conventionally in pyridine with an acylating agent to give the corresponding 21-acylates, wherein the acyl group may be different from the previously saponified one.

The following specific examples serve to illustrate the present invention, but are not intended to limit the scope thereof:

Example I

A cooled solution of 4 g. of 19-fluoro-Δ⁴-pregnen-17α-ol-3,20-dione (obtained according to my copending U.S. patent application Serial No. 328,474, filed December 6, 1963, in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the corresponding 21-iodo derivative. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol water, thus yielding 19-fluoro-Δ⁴-pregnene-17α,21-diol - 3,20 - dione 21-acetate (Compound No. 1).

Following the same procedure, the starting compounds listed under A (obtained in accordance with the aforesaid patent application) were converted into the corresponding products set forth under B.

| A | Compound No. | B |
|---|---|---|
| 19-fluoro-16α,17α-isopropylidenedioxy-Δ⁴-pregnene-3,20-dione. | 2 | 19-fluoro-16α,17α-isopropylidenedioxy-Δ⁴-pregnen-21-ol-3,20-dione acetate. |
| 19-fluoro-16α-methyl-Δ⁴-pregnen-17α-ol-3,20-dione. | 3 | 19-fluoro-16α-methyl-Δ⁴-pregnene-17α,21-diol-3,20-dione 21-acetate. |
| 19-fluoro-16β-methyl-Δ⁴-pregnen-17α-ol-3,20 dione. | 4 | 19-fluoro-16β-methyl-Δ⁴-pregnene-17α,21-diol-3,20-dione 21-acetate. |
| 19-chloro-16α,17α-isopropylidenedioxy-Δ⁴-pregnene-3,20-dione. | 5 | 19-chloro-16α,17α-isopropylidenedioxy-Δ⁴-pregnen-21-ol-3,20-dione acetate. |
| 19-chloro-Δ⁴-pregnen-17α-ol-3,20-dione. | 6 | 19-chloro-Δ⁴-pregnene-17α,21-diol-3,20-dione-21-acetate. |
| 19-chloro-16α-methyl-Δ⁴-pregnen-17α-ol-3,20-dione. | 7 | 19-chloro-16α-methyl-Δ⁴-pregnene-17α,21-diol-3,20-dione 21-acetate. |
| 19-chloro-16β-methyl-Δ⁴-pregnen-17α-ol-3,20-dione. | 8 | 19-chloro-16β-methyl-Δ⁴-pregnene-17α,21-diol-3,20-dione 21-acetate. |

Example II

A mixture of 5 g. of 19-fluoro-Δ⁴-pregnene-17α,21-diol-3,20-dione 21-acetate (Cpd. No. 1) 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3,20-biscycloethylenedioxy-19-fluoro - Δ⁵-pregnene - 17α,21 - diol 21-acetate (Cpd. No. 9).

The Compounds Nos. 2 to 8, inclusive, were treated by the above procedure, thus affording respectively:

Compound Nos.:
 10. 3,20-biscycloethylenedioxy-19-fluoro-16α,17α-isopropylidenedioxy-Δ⁵-pregnen-21-ol acetate.
 11. 3,20-biscycloethylenedioxy-19-fluoro-16α-methyl-Δ⁵-pregnene-17α,21-diol 21-acetate.
 12. 3,20-biscycloethylenedioxy-19-fluoro-16β-methyl-Δ⁵-pregnene-17α,21-diol 21-acetate.
 13. 3,20-biscycloethylenedioxy-19-chloro-16α,17α-isopropylidenedioxy-Δ⁵-pregnen-21-ol acetate.
 14. 3,20-bis-cycloethylenedioxy-19-chloro-Δ⁵-pregnene-17α,21-diol 21-acetate.
 15. 3,20-bis-cycloethylenedioxy-19-chloro-16α-methyl-Δ⁵-pregnene-17α,21-diol 21-acetate.
 16. 3,20-bis-cycloethylenedioxy-19-chloro-16β-methyl-Δ⁵-pregnene-17α,21-diol 21-acetate.

Example III

A solution of 2.5 g. of 3,20-bis-cycloethylenedioxy-19-fluoro-Δ⁵-pregnene-17α,21-diol 21-acetate (Cpd. No. 9) in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3,20-bis-cycloethylenedioxy - 19 - fluoro - 5α,6α - oxido-pregnane-17α,21-diol 21-acetate (Cpd. No. 17).

When applying the same procedure to Compounds Nos. 10 to 16, inclusive, there were respectively obtained.

Compound No.:
 18. 3,20-bis-cycloethylenedioxy-19-fluoro-16α,17α-isopropylidenedioxy-5α,6α-oxido-pregnan-21-ol acetate.
 19. 3,20-bis-cycloethylenedioxy-19-fluoro-16α-methyl-5α,6α-oxido-pregnane-17α,21-diol 21-acetate.

Cpd. No.:
20. 3,20-bis-cycloethylenedioxy-19-fluoro-16β-methyl-5α,6α-oxido-pregnane-17α,21-diol 21-acetate.
21. 3,20-bis-cycloethylenedioxy-19-chloro-16α,17α-isopropylidenedioxy-5α,6α-oxido-pregnan-21-ol acetate.
22. 3,20-bis-cycloethylenedioxy-19-chloro-5α,6α-oxido-pregnane-17α,21-diol 21-acetate.
23. 3,20-bis-cycloethylenedioxy-19-chloro-16α-methyl-5α,6α-oxido-pregnane-17α,21-diol 21-acetate.
24. 3,20-bis-cycloethylenedioxy-19-chloro-16β-methyl-5α,6α-oxido-pregnane-17α,21-diol 21-acetate.

*Example IV*

To a solution of 40 cc. of 4 N methylmagnesium bromide in ether was added, with stirring, a solution of 2 g. of 3,20-bis-cycloethylenedioxy - 19 - fluoro - 5α,6α-oxido-pregnane-17α,21-diol 21-acetate (Cpd. No. 17), in 60 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 400 cc. of a saturated solution of ammonium chloride was added slowly to the cooled mixture which was then stirred for 15 minutes before transfer to a separatory funnel. The tetrahydrofuran layer was separated, dried and evaporated to dryness.

A solution of the resulting residue in 70 cc. of methanol and 7 cc. of 8% aqueous sulfuric acid was refluxed for 40 minutes. It was then neutralized with saturated sodium carbonate solution, concentrated to ca. 20 cc. in vacuo and poured into water. The formed precipitate was filtered off, washed thoroughly with water and dried.

A solution of the dry precipitate 7 cc. of dry pyridine was cooled to −10° C., treated with 0.4 cc. of thionyl chloride and the mixture allowed to stand for 4 minutes at this temperature. Ice-water was added and the crystalline precipitate was filtered, washed and dried, yielding 19-fluoro-6β-methyl-Δ⁴-pregnene - 17α,21 - diol-3,20-dione (Compound No. 25).

The Compounds Nos. 18 to 24, inclusive, were treated by the above method, thus affording respectively.

Compound No.:
26. 19-fluoro-16α,17α-isopropylidenedioxy-6β-methyl-Δ⁴-pregnen-21-ol-3,20-dione.
27. 19-fluoro-6β,16α-dimethyl-Δ⁴-pregnene-17α,21-diol-3,20-dione.
28. 19-fluoro-6β,16β-dimethyl-Δ⁴-pregnene-17α,21-diol-3,20-dione.
29. 19-chloro-16α,17α-isopropylidene-dioxy-6β-methyl-Δ⁴-pregnen-21-ol-3,20-dione.
30. 19-chloro-6β-methyl-Δ⁴-pregnene-17α,21-diol-3,20-dione.
31. 19-chloro-6β,16α-dimethyl-Δ⁴-pregnene-17α,21-diol-3,20-dione.
32. 19-chloro-6β,16β-dimethyl-Δ⁴-pregnene-17α,21-diol-3,20-dione.

*Example V*

A solution of 1 g. of 19-fluoro-6β-methyl-Δ⁴- pregnene-17α,21-diol-3,20-dione (Cpd. No. 25) in 100 cc. of methanol and 50 cc. of 1 N aqueous sodium hydroxide was allowed to stand at room temperature under a nitrogen atmosphere for 24 hours. The solution was then concentrated under reduced pressure and without heating to half its volume, ice water was added and the crystalline precipitate filtered, washed and dried. Recrystallization from aqueous acetone gave, 19-fluoro-6α-methyl-Δ⁴-pregnene-17α,21-diol-3,20-dione (Compound No. 33).

When applying the same procedure to compounds Nos. 26 to 32, inclusive, there were respectively produced.

Cpd. No.:
34. 19-fluoro-16α,17α-isopropylidenedioxy-6α-methyl-Δ⁴-pregnen-21-ol-3,20-dione.
35. 19-fluoro-6α,16α-dimethyl-Δ⁴-pregnene-17α,21-diol-3,20-dione.
36. 19-fluoro-6α,16β-dimethyl-Δ⁴-pregnene-17α,21-diol-3,20-dione.
37. 19-chloro-16α,17α-isopropylidenedioxy-6α-methyl-Δ⁴-pregnen-21-ol-3,20-dione.
38. 19-chloro-6α-methyl-Δ⁴-pregnene-17α,21-diol-3,20-dione.
39. 19-chloro-6α,16α-dimethyl-Δ⁴-pregnene-17α,21-diol-3,20-dione.
40. 19-chloro-6α,16β-dimethyl-Δ⁴-pregnene-17α,21-diol-3,20-dione.

*Example VI*

Into a suspension of 1 g. of 3,20-bis-cycloethylenedioxy-19 - fluoro - 5α,6α - oxido - pregnane - 17α,21 - diol - 21-acetate (Cpd. No. 17) in 45 cc. of ethyl acetate was passed a slow stream of dry hydrochloric acid; after 10 minutes all the solid material was dissolved. The gas was passed through the reaction mixture for a total of 5 hours. The solution was washed abundantly with water, dried and evaporated to dryness. The residue was washed with water to neutrality and dried. Recrystallization from methylene chloride afforded 6α-chloro-19-fluoro-Δ⁴-pregnene - 17α,21 - diol - 3,20-dione 21 - acetate (Compound No. 41).

The compounds Nos. 18 to 24, inclusive, were treated by the above method, thus furnishing respectively.

Cpd. No.:
42. 6α-chloro-19-fluoro-16α,17α-isopropylidenedioxy-Δ⁴-pregnen-21-ol-3,20-dione acetate.
43. 6α-chloro-19-fluoro-16α-methyl-Δ⁴-pregnene-17α,21-diol-3,20-dione 21-acetate.
44. 6α-chloro-19-fluoro-16β-methyl-Δ⁴-pregnene-17α,21-diol-3,20-dione 21-acetate.
45. 6α,19-dichloro-16α,17α-isopropylidenedioxy-Δ⁴-pregnen-21-ol-3,20-dione acetate.
46. 6α,19-dichloro-Δ⁴-pregnene-17α,21-diol-3,20-dione 21-acetate.
47. 6α,19-dichloro-16α-methyl-Δ⁴-pregnene-17α,21-diol-3,20-dione 21-acetate.
48. 6α,19-dichloro-16β-methyl-Δ⁴-pregnene-17α,21-diol-3,20-dione 21-acetate.

*Example VII*

2.8 cc. of boron trifluoride etherate was slowly added with stirring to 220 mg. of anhydrous hydrogen fluoride cooled in an acetone-Dry Ice bath.

To a solution of 1 g. of compound No. 17 of Example III in 10 cc. of a mixture of equal parts of benzene and ether was added 1.3 cc. of the fluoroboric acid reagent. The mixture was kept for 3 hours at room temperature, then washed four times with water, dried over anhydrous sodium sulfate and the solvent evaporated under reduced pressure. The residue was suspended in 40 cc. of ethyl acetate and there was passed a slow stream of dry hydrochloric acid. The gas was passed through the reaction mixture for a total of 5 hours. The solution was then washed abundantly with water, dried and evaporated to dryness. The residue was washed with water to neutrality and dried. Recrystallization from methylene chloride-hexane afforded 6α,19-difluoro-Δ⁴-pregnene-17α,21-diol-3,20-dione 21-acetate (Cpd. No. 49).

The compounds Nos. 18 to 24, inclusive, were treated following the same procedure, thus yielding respectively.

Cpd. No.:
50. 6α,19-difluoro-16α,17α-isopropylidenedioxy-Δ⁴-pregnen-21-ol-3,20-dione acetate.
51. 6α,19-difluoro-16α-methyl-Δ⁴-pregnene-17α,21-diol-3,20-dione 21-acetate.

Cpd. No.:
- 52. 6α,19-difluoro-16β-methyl-Δ⁴-pregnene-17α,21-diol-3,20-dione 21-acetate.
- 53. 6α-fluoro-19-chloro-16α,17α-isopropylidenedioxy-Δ⁴-pregnen-21-ol-3,20-dione acetate.
- 54. 6α-fluoro-19-chloro-Δ⁴-pregnene-17α,21-diol-3,20-dione 21-acetate.
- 55. 6α-fluoro-19-chloro-16α-methyl-Δ⁴-pregnene-17α,21-diol-3,20-dione 21-acetate.
- 56. 6α-fluoro-19-chloro-16β-methyl-Δ⁴-pregnene-17α,21-diol-3,20-dione 21-acetate.

*Example VIII*

A suspension of 5 g. of 19-fluoro-Δ⁴-pregnene-17α,21-diol-3,20-dione 21-acetate (Cpd. No. 1) in 37.5 cc. of anhydrous peroxide-free dioxane was treated with 6.2 cc. of freshly distilled ethyl orthoformate and 2.5 g. of p-toluenesulfonic acid. The mixture was stirred at room temperature for 15 minutes and the resulting solution let stand for 30 minutes further. 4 cc. of pyridine were added and then water. The formed precipitate was collected by filtration, water washed and air dried. Recrystallization from acetone-hexane afforded 19-fluoro-3-ethoxy-Δ³,⁵-pregnadiene-17α,21-diol-20-one 21-acetate (Cpd. No. 57).

By the same procedure, there were treated the compounds Nos. 2 to 8, inclusive, thus affording respectively.
Cpd. No.:
- 58. 19-fluoro-16α,17α-isopropylidenedioxy-3-ethoxy-Δ³,⁵-pregnadien-21-ol-20-one acetate.
- 59. 19-fluoro-16α-methyl-3-ethoxy-Δ³,⁵-pregnadiene-17α,21-diol-20-one 21-acetate.
- 60. 19-fluoro-16β-methyl-3-ethoxy-Δ³,⁵-pregnadiene-17α,21-diol-20-one 21-acetate.
- 61. 19-chloro-16α,17α-isopropylidenedioxy-3-ethoxy-Δ³,⁵-pregnadien-21-ol-20-one acetate.
- 62. 19-chloro-3-ethoxy-Δ³,⁵-pregnadiene-17α,21-diol-20-one 21-acetate.
- 63. 19-chloro-16α-methyl-3-ethoxy-Δ³,⁵-pregnadiene-17α,21-diol-20-one 21-acetate.
- 64. 19-chloro-16β-methyl-3-ethoxy-Δ³,⁵-pregnadiene-17α,21-diol-20-one 21-acetate.

*Example IX*

A mixture of 5 g. of 19-fluoro-3-ethoxy-Δ³,⁵-pregnadiene-17α,21-diol-20-one 21-acetate (Cpd. No. 57) 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6β-chloro-19-fluoro-Δ⁴-pregnene-17α,21-diol-3,20-dione 21-acetate (Cpd. No. 65).

The compounds Nos. 58 to 64 inclusive, were treated by the same procedure, affording respectively.

Cpd. No.:
- 66. 6β-chloro-19-fluoro-16α,17α-isopropylidenedioxy-Δ⁴-pregnen-21-ol-3,20-dione acetate.
- 67. 6β-chloro-19-fluoro-16α-methyl-Δ⁴-pregnene-17α,21-diol-3,20-dione 21-acetate.
- 68. 6β-chloro-19-fluoro-16β-methyl-Δ⁴-pregnene-17α,21-diol-3,20-dione 21-acetate.
- 69. 6β,19-dichloro-16α,17α-isopropylidenedioxy-Δ⁴-pregnen-21-ol-3,20-dione acetate.
- 70. 6β,19-dichloro-Δ⁴-pregnene-17α,21-diol-3,20-dione 21-acetate.
- 71. 6β,19-dichloro-16α-methyl-Δ⁴-pregnene-17α,21-diol-3,20-dione 21-acetate.
- 72. 6β,19-dichloro-16β-methyl-Δ⁴-pregnene-17α,21-diol-3,20-dione 21-acetate.

*Example X*

1 g. of 19-fluoro-3-ethoxy-Δ³,⁵-pregnadiene-17α,21-diol-20-one 21-acetate (Cpd. No. 57) was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was obtained 6β,19-difluoro-Δ⁴-pregnene-17α,21-diol-3,20-dione 21-acetate (Cpd. No. 73).

The compounds Nos. 58 to 64 inclusive, were treated following the same procedure, thus yielding respectively.

Cpd. No.:
- 74. 6β,19-difluoro-16α,17α-isopropylidenedioxy-Δ⁴-pregnen-21-ol-3,20-dione acetate.
- 75. 6β,19-difluoro-16α-methyl-Δ⁴-pregnene-17α,21-diol-3,20-dione 21-acetate.
- 76. 6β,19-difluoro-16β-methyl-Δ⁴-pregnene-17α,21-diol-3,20-dione 21-acetate.
- 77. 6β-fluoro-19-chloro-16α,17α-isopropylidenedioxy-Δ⁴-pregnen-21-ol-3,20-dione acetate.
- 78. 6β-fluoro-19-chloro-Δ⁴-pregnene-17α,21-diol-3,20-dione 21-acetate.
- 79. 6β-fluoro-19-chloro-16α-methyl-Δ⁴-pregnene-17α,21-diol-3,20-dione 21-acetate.
- 80. 6β-fluoro-19-chloro-16β-methyl-Δ⁴-pregnene-17α,21-diol-3,20-dione 21-acetate.

*Example XI*

The following solutions "A," "B" and "C" were prepared using distilled water as solvent: solution "A" was prepared by mixing 425 cc. of a 1.74% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 19.1% magnesium sulfate, to a volume of 5 lt.; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

The defatted adrenal glands of recently slaughtered cattle, were ground in a meat grinder until a homogeneous mass was obtained; to 1 kg. of this mass was added 2 liters of the mixture of A, B, and C solutions with vigorous stirring. To the mixture there was then added 1 g. of 19-fluoro-Δ⁴-pregnene-17α,21-diol-3,20-dione 21-acetate (Cpd. No. 1), dissolved in 5.35 cc. of propylenglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. Chromatography on alumina and crystallization of the solid fractions afforded 19-fluoro-Δ⁴-pregnene-11β,17α,21-triol-3,20-dione 21-acetate (Cpd. No. 81).

The compounds Nos. 2 to 8 inclusive, were treated by the above procedure, thus affording respectively.

Cpd. No.:
- 82. 19-fluoro-16α,17α-isopropylidenedioxy-Δ⁴-pregnene-11β,21-diol-3,20-dione 21-acetate.
- 83. 19-fluoro-16α-methyl-Δ⁴-pregnene-11β,17α,21-triol-3,20-dione 21-acetate.
- 84. 19-fluoro-16β-methyl-Δ⁴-pregnene-11β-17α,21-triol-3,20-dione 21-acetate.
- 85. 19-chloro-16α,17α-isopropylidenedioxy-Δ⁴-pregnene-11β,21-diol-3,20-dione 21-acetate.

Cpd. No.:
86. 19-chloro-Δ⁴-pregnene-11β,17α,21-triol-3,20-dione 21-acetate.
87. 19-chloro-16α-methyl-Δ⁴-pregnene-11β,17α,21-triol-3,20-dione 21-acetate.
88. 19-chloro-16β-methyl-Δ⁴-pregnene-11β,17α,21-triol-3,20-dione 21-acetate.

*Example XII*

The compounds Nos. 25 to 56, inclusive, were treated following the procedure described in the foregoing example, thus affording respectively.

Cpd. No.:
89. 19-fluoro-6β-methyl-Δ⁴-pregnene-11β,17α,21-triol-3,20-dione.
90. 19-fluoro-16α,17α-isopropylidenedioxy-6β-methyl-Δ⁴-pregnene-11β,21-diol-3,20-dione.
91. 19-fluoro-6β,16α-dimethyl-Δ⁴-pregnene-11β,17α,21-triol-3,20-dione.
92. 19-fluoro-6β,16β-dimethyl-Δ⁴-pregnene-11β,17α,21-triol-3,20-dione.
93. 19-chloro-16α,17α-isopropylidenedioxy-6β-methyl-Δ⁴-pregnene-11β,21-diol-3,20-dione.
94. 19-chloro-6β-methyl-Δ⁴-pregnene-11β,17α,21-triol-3,20-dione.
95. 19-chloro-6β,16α-dimethyl-Δ⁴-pregnene-11β,17α,21-triol-3,20-dione.
96. 19-chloro-6β,16β-dimethyl-Δ⁴-pregnene-11β,17α,21-triol-3,20-dione.
97. 19-fluoro-6α-methyl-Δ⁴-pregnene-11β,17α,21-triol-3,20-dione.
98. 19-fluoro-16α,17α-isopropylidenedioxy-6α-methyl-Δ⁴-pregnene-11β,21-diol-3,20-dione.
99. 19-fluoro-6α,16α-dimethyl-Δ⁴-pregnene-11β,17α,21-triol-3,20-dione.
100. 19-fluoro-6α,16β-dimethyl-Δ⁴-pregnene-11β,17α,21-triol-3,20-dione.
101. 19-chloro-16α,17α-isopropylidenedioxy-6α-methyl-Δ⁴-pregnene-11β,21-diol-3,20-dione.
102. 19-chloro-6α-methyl-Δ⁴-pregnene-11β,17α,21-triol-3,20-dione.
103. 19-chloro-6α,16α-dimethyl-Δ⁴-pregnene-11β,17α,21-triol-3,20-dione.
104. 19-chloro-6α,16β-dimethyl-Δ⁴-pregnene-11β,17α,21-triol-3,20-dione.
105. 6α-chloro-19-fluoro-Δ⁴-pregnene-11β,17α,21-triol-3,20-dione 21-acetate.
106. 6α-chloro-19-fluoro-16α,17α-isopropylidenedioxy-Δ⁴-pregnene-11β,21-diol-3,20-dione 21-acetate.
107. 6α-chloro-19-fluoro-16α-methyl-Δ⁴-pregnene-11β,17α,21-triol-3,20-dione 21-acetate.
108. 6α-chloro-19-fluoro-16β-methyl-Δ⁴-pregnene-11β,17α,21-triol-3,20-dione 21-acetate.
109. 6α,19-dichloro-16α,17α-isopropylidenedioxy-Δ⁴-pregnene-11β,21-diol-3,20-dione 21-acetate.
110. 6α,19-dichloro-Δ⁴-pregnene-11β,17α,21-triol-3,20-dione 21-acetate.
111. 6α,19-dichloro-16α-methyl-Δ⁴-pregnene-11β,17α,21-triol-3,20-dione 21-acetate.
112. 6α,19-dichloro-16β-methyl-Δ⁴-pregnene-11β,17α,21-triol-3,20-dione 21-acetate.
113. 6α,19-difluoro-Δ⁴-pregnene-11β,17α,21-triol-3,20-dione 21-acetate.
114. 6α,19-difluoro-16α,17α-isopropylidenedioxy-Δ⁴-pregnene-11β,21-diol-3,20-dione 21-acetate.
115. 6α,19-difluoro-16α-methyl-Δ⁴-pregnene-11β,17α,21-triol-3,20-dione 21-acetate.
116. 6α,19-difluoro-16β-methyl-Δ⁴-pregnene-11β,17α,21-triol-3,20-dione 21-acetate.
117. 6α-fluoro-19-chloro-16α,17α-isopropylidenedioxy-Δ⁴-pregnene-11β,21-diol-3,20-dione 21-acetate.
118. 6α-fluoro-19-chloro-Δ⁴-pregnene-11β,17α,21-triol-3,20-dione 21-acetate.

Cpd. No.:
119. 6α-fluoro-19-chloro-16α-methyl-Δ⁴-pregnene-11β,17α,21-triol-3,20-dione 21-acetate.
120. 6α-fluoro-19-chloro-16β-methyl-Δ⁴-pregnene-11β,17α,21-triol-3,20-dione 21-acetate.

*Example XIII*

The compounds Nos. 65 to 80, inclusive, were treated in accordance with the procedure described in Example XI, thus affording respectively.

Cpd. No.:
121. 6β-chloro-19-fluoro-Δ⁴-pregnene-11β,17α,21-triol-3,20-dione 21-acetate.
122. 6β-chloro-19-fluoro-16α,17α-isopropylidenedioxy-Δ⁴-pregnene-11β,21-diol-3,20-dione 21-acetate.
123. 6β-chloro-19-fluoro-16α-methyl-Δ⁴-pregnene-11β,17α,21-triol-3,20-dione 21-acetate.
124. 6β-chloro-19-fluoro-16β-methyl-Δ⁴-pregnene-11β,17α,21-triol-3,20-dione 21-acetate.
125. 6β,19-dichloro-16α,17α-isopropylidenedioxy-Δ⁴-pregnene-11β,21-diol-3,20-dione 21-acetate.
126. 6β,19-dichloro-Δ⁴-pregnene-11β,17α,21-triol-3,20-dione 21-acetate.
127. 6β,19-dichloro-16α-methyl-Δ⁴-pregnene-11β,17α,21-triol-3,20-dione 21-acetate.
128. 6β,19-dichloro-16β-methyl-Δ⁴-pregnene-11β,17α,21-triol-3,20-dione 21-acetate.
129. 6β,19-difluoro-Δ⁴-pregnene-11β,17α,21-triol-3,20-dione 21-acetate.
130. 6β,19-difluoro-16α,17α-isopropylidenedioxy-Δ⁴-pregnene-11β,21-diol-3,20-dione 21-acetate.
131. 6β,19-difluoro-16α-methyl-Δ⁴-pregnene-11β,17α,21-triol-3,20-dione 21-acetate.
132. 6β,19-difluoro-16β-methyl-Δ⁴-pregnene-11β,17α,21-triol-3,20-dione 21-acetate.
133. 6β-fluoro-19-chloro-16α,17α-isopropylidenedioxy-Δ⁴-pregnene-11β,21-diol-3,20-dione 21-acetate.
134. 6β-fluoro-19-chloro-Δ⁴-pregnene-11β,17α,21-triol-3,20-dione 21-acetate.
135. 6β-fluoro-19-chloro-16α-methyl-Δ⁴-pregnene-11β,17α,21-triol-3,20-dione 21-acetate.
136. 6β-fluoro-19-chloro-16β-methyl-Δ⁴-pregnene-11β,17α,21-triol-3,20-dione 21-acetate.

*Example XIV*

5 g. of 19-fluoro-Δ⁴-pregnene-11β,17α,21-triol-3,20-dione 21-acetate (Cpd. No. 81), was dissolved with slow heating in 72.5 cc. of dimethyl-formamide, the mixture was cooled, 2.1 g. of mesyl chloride and 2.5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 19-fluoro-Δ⁴,⁹⁽¹¹⁾-pregnadiene-17α,21-diol-3,20-dione 21-acetate.

2.8 g. of N-bromoacetamide were added to a mixture of 5 g. of the latter steroid, 50 cc. of pure dioxane and 0.8 cc. of 0.4 N perchloric acid while stirring in the dark and at room temperature during 1 hour. The reaction mixture was stirred for 1 hour further, a solution of 10% sodium sulfite was then added until the potassium-iodide starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained the corresponding 9α-bromo-11β-ol derivative.

A mixture of 2 g. of anhydrous potassium acetate and 20 cc. of acetone was heated almost to boiling and then a solution of 1.7 g. of the bromohydrin in 20 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-benzene there was obtained 19-fluoro-9β,11β-oxido-Δ⁴-pregnene-17α,21-diol-3,20-dione 21-acetate (Cpd. No. 137).

Following exactly the same procedures, the compounds Nos. 82 to 136 inclusive, were successively converted into the corresponding Δ⁴,⁹⁽¹¹⁾-pregnadiene derivatives, the corresponding Δ⁴-9α-bromo-11β-ols and then respectively into the following oxido compounds.

Compound No.:
138. 19-fluoro-9β,11β-oxido-16α,17α-isopropylidene-dioxy-Δ⁴-pregnen-21-ol-3,20-dione acetate.
139. 19-fluoro-9β,11β-oxido-16α-methyl-Δ⁴-pregnene-17α,21-diol-3,20-dione 21-acetate.
140. 19-fluoro-9β,11β-oxido-16β-methyl-Δ⁴-pregnene-17α,21-diol-3,20-dione 21-acetate.
141. 19-chloro-9β,11β-oxido-16α,17α-isopropylidene-dioxy-Δ⁴-pregnen-21-ol-3,20-dione acetate.
142. 19-chloro-9β,11β-oxido-Δ⁴-pregnene-17α,21-diol-3,20-dione 21-acetate.
143. 19-chloro-9β,11β-oxido-16α-methyl-Δ⁴-pregnene-17α,21-diol-3,20-dione 21-acetate.
144. 19-chloro-9β,11β-oxido-16β-methyl-Δ⁴-pregnene-17α,21-diol-3,20-dione 21-acetate.
145. 19-fluoro-9β,11β-oxido-6β-methyl-Δ⁴-pregnene-17α,21-diol-3,20-dione.
146. 19-fluoro-9β,11β-oxido-16α,17α-isopropylidene-dioxy-6β-methyl-Δ⁴-pregnen-21-ol-3,20-dione.
147. 19-fluoro-9β,11β-oxido-6β,16α-dimethyl-Δ⁴-pregnene-17α,21-diol-3,20-dione.
148. 19-fluoro-9β,11β-oxido-6β,16β-dimethyl-Δ⁴-pregnene-17α,21-diol-3,20-dione.
149. 19-chloro-9β,11β-oxido-16α,17α-isopropylidene-dioxy-6β-methyl-Δ⁴-pregnen-ol-3,20-dione.
150. 19-chloro-9β,11β-oxido-6β-methyl-Δ⁴-pregnen-17α,21-diol-3,20-dione.
151. 19-chloro-9β,11β-oxido-6β,16α-dimethyl-Δ⁴-pregnene-17α,21-diol-3,20-dione.
152. 19-chloro-9β,11β-oxido-6β,16β-dimethyl-Δ⁴-pregnene-17α,21-diol-3,20-dione.
153. 19-fluoro-9β,11β-oxido-6α-methyl-Δ⁴-pregnene-17α,21-diol-3,20-dione.
154. 19-fluoro-9β,11β-oxido-16α,17α-isopropylidene-dioxy-6α-methyl-Δ⁴-pregnen-21-ol-3,20-dione.
155. 19-fluoro-9β,11β-oxido-6α,16α-dimethyl-Δ⁴-pregnene-17α,21-diol-3,20-dione.
156. 19-fluoro-9β,11β-oxido-6α,16β-dimethyl-Δ⁴-pregnene-17α,21-diol-3,20-dione.
157. 19-chloro-9β,11β-oxido-16α,17α-isopropylidene-dioxy-6α-methyl-Δ⁴-pregnen-21-ol-3,20-dione.
158. 19-chloro-9β,11β-oxido-6α-methyl-Δ⁴-pregnene-17α,21-diol-3,20-dione.
159. 19-chloro-9β,11β-oxido-6α,16α-dimethyl-Δ⁴-pregnene-17α,21-diol-3,20-dione.
160. 19-chloro-9β,11β-oxido-6α,16β-dimethyl-Δ⁴-pregnene-17α,21-diol-3,20-dione.
161. 6α-chloro-19-fluoro-9β,11β-oxido-Δ⁴-pregnene-17α,21-diol-3,20-dione 21-acetate.
162. 6α-chloro-19-fluoro-9β,11β-oxido-16α,17α-isopropylidenedioxy-Δ⁴-pregnen-21-ol-3,20-dione acetate.
163. 6α-chloro-19-fluoro-9β,11β-oxido-16α-methyl-Δ⁴-pregnene-17α,21-diol-3,20-dione 21-acetate.
164. 6α-chloro-19-fluoro-9β,11β-oxido-16β-methyl-Δ⁴-pregnene-17α,21-diol-3,20-dione 21-acetate.
165. 6α,19-dichloro-9β,11β-oxido-16α,17α-isopropyl-idenedioxy-Δ⁴-pregnen-21-ol-3,20-dione acetate.
166. 6α,19-dichloro-9β,11β-oxido-Δ⁴-pregnene-17α,21-diol-3,20-dione 21-acetate.
167. 6α,19-dichloro-9β,11β-oxido-16α-methyl-Δ⁴-pregnene-17α,21-diol-3,20-dione 21-acetate.

Cpd. No.:
168. 6α,19-dichloro-9β,11β-oxido-16β-methyl-Δ⁴-pregnene-17α,21-diol-3,20-dione 21-acetate.
169. 6α,19-difluoro-9β,11β-oxido-Δ⁴-pregnene-17α,21-diol-3,20-dione 21-acetate.
170. 6α,19-difluoro-9β,11β-oxido-16α,17α-isopropylidenedioxy-Δ⁴-pregnen-21-ol-3,20-dione acetate.
171. 6α,19-difluoro-9β,11β-oxido-16α-methyl-Δ⁴-pregnene-17α,21-diol-3,20-dione 21-acetate.
172. 6α,19-difluoro-9β,11β-oxido-16β-methyl-Δ⁴-pregnene-17α,21-diol-3,20-dione 21-acetate.
173. 6α-fluoro19-chloro-9β,11β-oxido-16α,17α-isopropylidenedioxy-Δ⁴-pregnen-21-ol-3,20-dione acetate.
174. 6α-fluoro-19-chloro-9β,11β-oxido-Δ⁴-pregnene-17α,21-diol-3,20-dione 21-acetate.
175. 6α-fluoro-19-chloro-9β,11β-oxido-16α-methyl-Δ⁴-pregnene-17α,21-diol-3,20-dione 21-acetate.
176. 6α-fluoro-19-chloro-9β,11β-oxido-16β-methyl-Δ⁴-pregnene-17α,21-diol-3,20-dione 21acetate.
177. 6β-chloro-19-fluoro-9β,11β-oxido-Δ⁴-pregnene-17α,21-diol-3,20-dione 21-acetate.
178. 6β-chloro-19-fluoro9β,11β-oxido-16α,17α-isopropylidenedioxy-Δ⁴-pregnene-21-ol-3,20-dione acetate.
179. 6β-chloro-19-fluoro-9β,11β-oxido-16α-methyl-Δ⁴-pregnene-17α,21-diol-3,20-dione 21-acetate.
180. 6β-chloro-19-fluoro-9β,11β-oxido-16β-methyl-Δ⁴-pregnene-17α,21-diol-3,20-dione 21-acetate.
181. 6β,19-dichloro-9β,11β-oxido-16α,17α-isopropylidenedioxy-Δ⁴-pregnene-17α,21-diol-3,20-dione 21-acetate.
182. 6β,19-dichloro-9β,11β-oxido-Δ⁴-pregnene-17α,21-diol-3,20-dione 21-acetate.
183. 6β,19-dichloro-9β,11β-oxido-16α-methyl-Δ⁴-pregnene-17α,21-diol-3,20-dione 21-acetate.
184. 6β,19-dichloro-9β,11β-oxido-16β-methyl-Δ⁴-pregnene-17α,21-diol-3,20-dione 21-acetate.
185. 6β-19-difluoro-9β,11β-oxido-Δ⁴-pregnene-17α,21-diol-3,20-dione 21-acetate.
186. 6β,19-difluoro-9β,11β-oxido-16α,17α-isopropyl-idenedioxy-Δ⁴-pregnen-21-ol-3,20-dione acetate.
187. 6β,19-difluoro-9β,11β-oxido-16α-methyl-Δ⁴-pregnene-17α,21-diol-3,20-dione 21-acetate.
188. 6β,19-difluoro-9β,11β-oxido-16β-methyl-Δ⁴-pregnene-17α,21-diol-3,20-dione 21-acetate.
189. 6β-fluoro19-chloro-9β,11β-oxido-16α,17α-isopropylidenedioxy-Δ⁴-pregnen-21-ol-3,20-dione acetate.
190. 6β-fluoro-19-chloro-9β,11β-oxido-Δ⁴-pregnene-17α,21-diol-3,20-dione 21-acetate.
191. 6β-fluoro-19-chloro-9β,11β-oxido-16α-methyl-Δ⁴-pregnene-17α,21-diol-3,20-dione 21-acetate.
192. 6β-fluoro-19-chloro-9β,11β-oxido-16β-methyl-Δ⁴-pregnene-17α,21-diol-3,20-dione 21-acetate.

*Example XV*

In a polyethylene flask, adapted with magnetic stirrer, there was dissolved 1.8 g. of 19-fluoro-9β,11β-oxido-Δ⁴-pregnene-17α,21-diol-3,20-dione 21-acetate (Cpd. No. 137) in 30 cc. of methylene chloride, the solution was cooled to 0° C. and a solution of 2.11 g. of anhydrous hydrogen fluoride in 3.7 cc. of tetrahydrofurane cooled in a Dry-Ice acetone bath (—70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 9α,19-difluoro-Δ⁴-pregnene-11β,17α,21-triol-3,20-dione 21-acetate (Cpd. No. 193).

When applying the above procedure to the compounds Nos. 138 to 192, inclusive, there were respectively obtained:

Cpd. No.:
- 194. 9α,19-difluoro-16α,17α-isopropylidenedioxy-Δ⁴-pregnene-11β,21-diol-3,20-dione 21-acetate.
- 195. 9α,19-difluoro-16α-methyl-Δ⁴-pregnene-11β,17α,21-triol-3,20-dione 21-acetate.
- 196. 9α,19-difluoro-16β-methyl-Δ⁴-pregnene-11β,17α,21-triol-3,20-dione 21-acetate.
- 197. 9α-fluoro-19-chloro-16α,17α-isopropylidenedioxy-Δ⁴-pregnene-11β,21-diol-3,20-dione 21-acetate.
- 198. 9α-fluoro-19-chloro-Δ⁴-pregnene-11β,17α,21-triol-3,20-dione 21-acetate.
- 199. 9α-fluoro-19-chloro-16α-methyl-Δ⁴-pregnene-11β,17α,21-triol-3,20-dione 21-acetate.
- 200. 9α-fluoro-19-chloro-16β-methyl-Δ⁴-pregnene-11β,17α,21-triol-3,20-dione 21-acetate.
- 201. 9α,19-difluoro-6β-methyl-Δ⁴-pregnene-11β,17α,21-triol-3,20-dione.
- 202. 9α,19-difluoro-16α,17α-isopropylidenedioxy-6β-methyl-Δ⁴-pregnene-11β,21-diol-3,20-dione.
- 203. 9α,19-difluoro-6β,16α-dimethyl-Δ⁴-pregnene-11β,17α,21-triol-3,20-dione.
- 204. 9α19-difluoro-6β,16β-dimethyl-Δ⁴-pregnene-11β,17α,21-triol-3,20-dione.
- 205. 9α-fluoro-19-chloro-16α,17α-isopropylidenedioxy-6β-methyl-Δ⁴-pregnene-11β,21-diol-3,20-dione.
- 206. 9α-fluoro-19-chloro-6β-methyl-Δ⁴-pregnene-11β,17α,21-triol-3,20-dione.
- 207. 9α-fluoro-19-chloro-6β,16α-dimethyl-Δ⁴-pregnene-11β,17α,21-triol-3,20-dione.
- 208. 9α-fluoro-19-chloro-6β,16β-dimethyl-Δ⁴-pregnene-11β,17α,21-triol-3,20-dione.
- 209. 9α,19-difluoro-6α-methyl-Δ⁴-pregnene-11β,17α,21-triol-3,20-dione.
- 210. 9α,19-difluoro-16α,17α-isopropylidenedioxy-6α-methyl-Δ⁴-pregnene-11β,21-diol-3,20-dione.
- 211. 9α,19-difluoro-6α,16α-dimethyl-Δ⁴-pregnene-11β,17α,21-triol-3,20-dione.
- 212. 9α,19-difluoro-6α,16β-dimethyl-Δ⁴-pregnene-11β,17α,21-triol-3,20-dione.
- 213. 9α-fluoro-19-chloro-16α,17α-isopropylidenedioxy-6α-methyl-Δ⁴-pregnene-11β,21-diol-3,20-dione.
- 214. 9α-fluoro-19-chloro-6α-methyl-Δ⁴-pregnene-11β,17α,21-triol-3,20-dione.
- 215. 9α-fluoro-19-chloro-6α,16α-dimethyl-Δ⁴-pregnene-11β,17α,21-triol-3,20-dione.
- 216. 9α-fluoro-19-chloro-6α,16β-dimethyl-Δ⁴-pregnene-11β,17α,21-triol-3,20-dione.
- 217. 6α-chloro-9α,19-difluoro-Δ⁴-pregnene-11β,17α,21-triol-3,20-dione 21-acetate.
- 218. 6α-chloro-9α,19-difluoro-16α,17α-isopropylidenedioxy-Δ⁴-pregnene-11β,21-diol-3,20-dione 21-acetate.
- 219. 6α-chloro-9α,difluoro-16α-methyl-Δ⁴-pregnene-11β,17α,21-triol-3,20-dione 21-acetate.
- 220. 6α-chloro-9α,19-difluoro-16β-methyl-Δ⁴-pregnene-11β,17α,21-triol-3,20-dione 21-acetate.
- 221. 9α-fluoro-6α,19-dichloro-16α,17α-isopropylidenedioxy-Δ⁴-pregnene-11β,21-diol-3,20-dione 21-acetate.
- 222. 9α-fluoro-6α,19-dichloro-Δ⁴-pregnene-11β,17α,21-triol-3,20-dione 21-acetate.
- 223. 9α-fluoro-6α,19-dichloro-16α-methyl-Δ⁴-pregnene-11β,17α,21-triol-3,20-dione 21-acetate.
- 224. 9α-fluoro-6α,19-dichloro-16β-methyl-Δ⁴-pregnene-11β,17α,21-triol-3,20-dione 21-acetate.

Cpd. No.:
- 225. 6α,-9α,19-trifluoro-Δ⁴-pregnene-11β,17α,21-triol-3,20-dione 21-acetate.
- 226. 6α,9α,19-trifluoro-16α,17α-isopropylidenedioxy-Δ⁴-pregnene-11β,21-diol-3,20-dione-21-acetate.
- 227. 6α,9α,19-trifluoro-16α-methyl-Δ⁴-pregnene-11β,17α,21-triol-3,20-dione 21-acetate.
- 228. 6α,9α,19-trifluoro-16β-methyl-Δ⁴-pregnene-11β,17α,21-triol-3,20-dione 21-acetate.
- 229. 6α,9α-difluoro-19-chloro-16α,17α-isopropylidenedioxy-Δ⁴-pregnene-11β,21-diol-3,20-dione 21-acetate.
- 230. 6α,9α-difluoro-19-chloro-Δ⁴-pregnene-11β,17α-21-triol-3,20-dione 21-acetate.
- 231. 6α,9α-difluoro-19-chloro-16α-methyl-Δ⁴-pregnene-11β,17α,21-triol-3,20-dione 21-acetate.
- 232. 6α,9α-difluoro-19-chloro-16β-methyl-Δ⁴-pregnene-11β,17α,21-triol-3,20-dione 21-acetate.
- 233. 6β-chloro-9α,19-difluoro-Δ⁴-pregnene-11β,17α,21-triol-3,20-dione 21-acetate.
- 234. 6β-chloro-9α,19-difluoro-16α,17α-isopropylidenedioxy-Δ⁴-pregnene-11β,21-diol-3,20-dione 21-acetate.
- 235. 6β-chloro-9α,19-difluoro-16α-methyl-Δ⁴-pregnene-11β,17α,21-triol-3,20-dione 21-acetate.
- 236. 6β-chloro-9α,19-difluoro-16β-methyl-Δ⁴-pregnene-11β,17α,21-triol-3,20-dione 21-acetate.
- 237. 9α-fluoro-6β,19-dichloro-16α,17α-isopropylidenedioxy-Δ⁴-pregnene-11β,21-diol-3,20-dione 21-acetate.
- 238. 9α-fluoro-6β,19-dichloro-Δ⁴-pregnene-11β,17α,21-triol-3,20-dione 21-acetate.
- 239. 9α-fluoro-6β-19-dichloro-16α-methyl-Δ⁴-pregnene-11β,17α,21-triol-3,20-dione 21-acetate.
- 240. 9α-fluoro-6β,19-dichloro-16β methyl-Δ⁴-pregnene-11β,17α,21-triol-3,20-dione 21-acetate.
- 241. 6β,9α,19-trifluoro-Δ⁴-pregnene-11β,17α,21-triol-3,20-dione 21-acetate.
- 242. 6β,9α,19-trifluoro-16α,17α-isopropylidenedioxy-Δ⁴-pregnene-11β,21-diol-3,20-dione 21-acetate.
- 243. 6β,9α,19-trifluoro-16α-methyl-Δ⁴-pregnene-11β,17α,21-triol-3,20-dione 21-acetate.
- 244. 6β,9α,19-trifluoro-16β-methyl-Δ⁴-pregnene-11β,17α,21-triol-3,20-dione 21-acetate.
- 245. 6β,9α-difluoro-19-chloro-16α,17α-isopropylidenedioxy-Δ⁴-pregnene-11β,21-diol-3,20-dione 21-acetate.
- 246. 6β,9α-difluoro-19-chloro-Δ⁴-pregnene-11β,17α,21-triol-3,20-dione 21-acetate.
- 247. 6β,9α-difluoro-19-chloro-16α-methyl-Δ⁴-pregnene-11β,17α,21-triol-3,20-dione 21-acetate.
- 248. 6β,9α-difluoro-19-chloro-16β-Methyl-Δ⁴-pregnene-11β,17α,21-triol-3,20-dione 21-acetate.

*Example XVI*

To a solution of 4 g. of 19-fluoro-9β,11β-oxido-Δ⁴-pregnene-17α,21-diol-3,20-dione 21-acetate (Cpd. No. 137), in 40 cc. of anhydrous chloroform, was added, over a period of 35 minutes, 30 cc. of a 0.45 N solution of dry hydrogen chloride in chloroform, under continuous stirring and maintaining the temperature around 0° C. the mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 9α-chloro-19-fluoro-Δ⁴-pregnene-11β,17α,21-triol-3,20-dione 21-acetate (Cpd. No. 249).

The compounds Nos. 138 to 192, inclusive, were treated by the same procedure thus affording respectively Cpd. No.:
250. 9α-chloro-19-fluoro-16α,17α-isopropylidenedioxy-Δ⁴-pregnene-11β,21-diol-3,20-dione 21-acetate.
251. 9α-chloro-19-fluoro-16α-methyl-Δ⁴-pregnene-11β,17α,21-triol-3,20-dione 21-acetate.
252. 9α-chloro-19-fluoro-16β-methyl-Δ⁴-pregnene-11β,17α,21-triol-3,20-dione 21-acetate.
253. 9α,19-dichloro-16α,17α-isopropylidenedioxy-Δ⁴-pregnene-11β,21-diol-3,20-dione 21-acetate.
254. 9α,19-dichloro-Δ⁴-pregnene-11β,17α,21-triol-3,20-dione 21-acetate.
255. 9α,19-dichloro-16α-methyl-Δ⁴-pregnene-11β,17α,21-triol-3,20-dione 21-acetate.
256. 9α,19-dichloro-16β-methyl-Δ⁴-pregnene-11β,17α,21-triol-3,20-dione 21-acetate.
257. 9α-chloro-19-fluoro-6β-methyl-Δ⁴-pregnene-11β,17α,21-triol-3,20-dione.
258. 9α-chloro-19-fluoro-16α,17α-isopropylidenedioxy-6β-methyl-Δ⁴-pregnene-11β,21-diol-3,20-dione.
259. 9α-chloro-19-fluoro-6β,16α-dimethyl-Δ⁴-pregnene-11β,17α,21-triol-3,20-dione.
260. 9α-chloro-19-fluoro-6β,16β-dimethyl-Δ⁴-pregnene-11β,17α,21-triol-3,20-dione.
261. 9α,19-dichloro-16α,17α-isopropylidenedioxy-6β-methyl-Δ⁴-pregnene-11β,21-diol-3,20-dione.
262. 9α,19-dichloro-6β-methyl-Δ⁴-pregnene-11β,17α,21-triol-3,20-dione.
263. 9α,19-dichloro-6β,16α-dimethyl-Δ⁴-pregnene-11β,17α,21-triol-3,20-dione.
264. 9α,19-dichloro-6β,16β-dimethyl-Δ⁴-pregnene-11β,17α,21-triol-3,20-dione.
265. 9α-chloro-19-fluoro-6α-methyl-Δ⁴-pregnene-11β,17α,21-triol-3,20-dione.
266. 9α-chloro-19-fluoro-16α,17α-isopropylidenedioxy-6α-methyl-Δ⁴-pregnene-11β,21-diol-3,20-dione.
267. 9α-chloro-19-fluoro-6α,16α-dimethyl-Δ⁴-pregnene-11β,17α,21-triol-3,20-dione.
268. 9α-chloro-19-fluoro-6α,16β-dimethyl-Δ⁴-pregnene-11β,17α,21-triol-3,20-dione.
269. 9α,19-dichloro-16α,17α-isopropylidenedioxy-6α-methyl-Δ⁴-pregnene-11β,21-diol-3,20-dione.
270. 9α,19-dichloro-6α-methyl-Δ⁴-pregnene-11β,17α,21-triol-3,20-dione.
271. 9α,19-dichloro-6α,16α-dimethyl-Δ⁴-pregnene-11β,17α,21-triol-3,20-dione.
272. 9α,19-dichloro-6α,16β-dimethyl-Δ⁴-pregnene-11β,17α,21-triol-3,20-dione.
273. 6α,9α-dichloro-19-fluoro-Δ⁴-pregnene-11β,17α,21-triol-3,20-dione 21-acetate.
274. 6α,9α-dichloro-19-fluoro-16α,17α-isopropylidenedioxy-Δ⁴-pregnene-11β,21-diol-3,20-dione 21-acetate.
275. 6α,9α-dichloro-19-fluoro-16α-methyl-Δ⁴-pregnene-11β,17α,21-triol-3,20-dione 21-acetate.
276. 6α,9α-dichloro-19-fluoro-16β-methyl-Δ⁴-pregnene-11β,17α,21-triol-3,20-dione 21-acetate.
277. 6α,9α,19-trichloro-16α,17α-isopropylidenedioxy-Δ⁴-pregnene-11β,21-diol-3,20-dione 21-acetate.
278. 6α,9α,19-trichloro-Δ⁴-pregnene-11β,17α,21-triol-3,20-dione 21-acetate.
279. 6α,9α,19-trichloro-16α-methyl-Δ⁴-pregnene-11β,17α,21-triol-3,20-dione 21-acetate.

Cpd. No.:
280. 6α,9α,19-trichloro-16β-methyl-Δ⁴-pregnene-11β,17α,21-triol-3,20-dione 21-acetate.
281. 9α-chloro-6α,19-difluoro-Δ⁴-pregnene-11β,17α,21-triol-3,20-dione 21-acetate.
282. 9α-chloro-6α,19-difluoro-16α,17α-isopropylidenedioxy-Δ⁴-pregnene-11β,21-diol-3,20-dione 21-acetate.
283. 9α-chloro-6α,19-difluoro-16α-methyl-Δ⁴-pregnene-11β,17α,21-triol-3,20-dione 21-acetate.
284. 9α-chloro-6α,19-difluoro-16β-methyl-Δ⁴-pregnene-11β,17α,21-triol-3,20-dione 21-acetate.
285. 6α-fluoro-9α,19-dichloro-16α,17α-isopropylidenedioxy-Δ⁴-pregnene-11β,21-diol-3,20-dione 21-acetate.
286. 6α-fluoro-9α,19-dichloro-Δ⁴-pregnene-11β,17α,21-triol-3,20-dione 21-acetate.
287. 6α-fluoro-9α,19-dichloro-16α-methyl-Δ⁴-pregnene-11β,17α,21-triol-3,20-dione 21-acetate.
288. 6α-fluoro-9α,19-dichloro-16β-methyl-Δ⁴-pregnene-11β,17α,21-triol-3,20-dione 21-acetate.
289. 6β,9α-dichloro-19-fluoro-Δ⁴-pregnene-11β,17α,21-triol-3,20-dione 21-acetate.
290. 6β,9α-dichloro-19-fluoro-16α,17α-isopropylidenedioxy-Δ⁴-pregnene-11β,21-diol-3,20-dione 21-acetate.
291. 6β,9α-dichoro-19-fluoro-16α-methyl-Δ⁴-pregnene-11β,17α,21-triol-3,20-dione 21-acetate.
292. 6β,9α-dichloro-19-fluoro-16β-methyl-Δ⁴-pregnene-11β,17α,21-triol-3,20-dione 21-acetate.
293. 6β,9α,19-trichloro-16α,17α-isopropylidenedioxy-Δ⁴-pregnene-11β,21-diol-3,20-dione 21-acetate.
294. 6β,9α,19-trichloro-Δ⁴-pregnene-11β,17α,21-triol-3,20-dione 21-acetate.
295. 6β,9α,19-trichloro-16α-methyl-Δ⁴-pregnene-11β,17α,21-triol-3,20-dione 21-acetate.
296. 6β,9α,19-trichloro-16β-methyl-Δ⁴-pregnene-11β,17α,21-triol-3,20-dione 21-acetate.
297. 9α-chloro-6β,19-difluoro-Δ⁴-pregnene-11β,17α,21-triol-3,20-dione 21-acetate.
298. 9α - chloro - 6β,19 - difluoro - 16α,17α - isopropylidenedioxy - Δ⁴ - pregnene - 11β,21 - diol-3,20-dione 21-acetate.
299. 9α - chloro - 6β,19 - difluoro - 16α - methyl-Δ⁴ - pregnene - 11β,17α,21 - triol - 3,20 - dione 21-acetate.
300. 9α - chloro - 6β,19 - difluoro - 16β - methyl-Δ⁴ - pregnene - 11β,17α,21 - triol - 3,20 - dione 21-acetate.
301. 6β - fluoro - 9α,19 - dichloro - 16α,17α - isopropylidenedioxy - Δ⁴ - pregnene - 11β,21 - diol-3,20-dione 2-acetate.
302. 6β - fluoro - 9α,19 - dichloro - Δ⁴ - pregnene-11β,17α,21-triol-3,20-dione 21-acetate.
303. 6β - fluoro - 9α,19 - dichloro - 16α - methyl-Δ⁴ - pregnene - 11β,17α,21 - triol - 3,20 - dione 21-acetate.
304. 6β - fluoro - 9α,19 - dichloro - 16β - methyl-Δ⁴ - pregnene - 11β,17α,21 - triol - 3,20 - dione 21-acetate.

*Example XVII*

A solution of 1 g. of 19-fluoro-Δ⁴-pregnene-11β,17α,21-triol-3,20-dione 21-acetate (Cpd. No. 81) in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 19- fluoro-Δ⁴-pregnene-17α,21-diol-3,11,20-trione 21-acetate (Cpd. 305).

The compounds Nos. 82 to 88, inclusive, were treated by the above procedure, thus affording respectively.

Cpd. No.:
- 306. 19-fluoro-16α,17α-isopropylidenedioxy-Δ⁴-pregnen-21-ol-3,11,20-trione acetate.
- 307. 19-fluoro-16α-methyl-Δ⁴-pregnene-17α,21-diol-3,11,20-trione 21-acetate.
- 308. 19-fluoro-16β-methyl-Δ⁴-pregnene-17α,21-diol-3,11,20-trione 21-acetate.
- 309. chloro-16α,17α-isopropylidenedioxy-Δ4-pregnen-21-ol-3,11,20-trione acetate.
- 310. 19-chloro-Δ⁴-pregnene-17α,21-diol-3,11,20-trione 21-acetate.
- 311. 19-chloro-16α-methyl-Δ⁴-pregnene-17α,21-diol-3-11,20-trione 21-acetate.
- 312. 19-chloro-16β-methyl-Δ⁴-pregnene-17α,21-diol-3,11-20-trione 21-acetate.

*Example XVIII*

The compounds Nos. 105 to 136, inclusive, were treated following the procedure described in Example XVII, thus affording the corresponding 3,11,20-trione derivatives.

*Example XIX*

The compounds Nos. 193 to 200, inclusive, Nos. 217 to 256, inclusive, and Nos. 273 to 304, inclusive, were treated in accordance with Example XVII, thus yielding the corresponding 3,11,20-trione derivatives.

*Example XX*

A mixture of 1 g. of 19-fluoro-Δ⁴-pregnene-11β,17α,21-triol-3,20-dione 21-acetate (Cpd. No. 81) 2 g. of chloranil and 50 cc. of terbutanol was refluxed for 8 hours. The mixture was cooled, the excess of chloranil filtered off and washed with ethyl acetate and the organic extracts washed with a cold aqueous solution of 10% sodium hydroxide until the washings were colorless. It was then dried over anhydrous sodium sulfate and evaporated to dryness. Recrystallization from methylene chloride-ether, after decolorization with 2 g. of alumina, gave 19-fluoro-Δ⁴,⁶-pregnadiene-11β,17α,21-triol-3,20-dione 21-acetate (Cpd. No. 313).

Following the same procedure, there were treated the compounds Nos. 82 to 88, inclusive, affording respectively.

Cpd. No.:
- 314. 19-fluoro-16α,17α-isopropylidenedioxy-Δ⁴,⁶-pregnadiene-11β,21-diol-3-,20-dione 21-acetate.
- 315. 19-fluoro-16α-methyl-Δ⁴,⁶-pregnadiene-11β,17α,21-triol-3,20-dione 21-acetate.
- 316. 19-fluoro-16β-methyl-Δ⁴,⁶-pregnadiene-11β,17α,21-triol-3,20-dione 21-acetate.
- 317. 19-chloro-16α,17α-isopropylidenedioxy-Δ⁴,⁶-pregnadiene-11β,21-diol-3,20-dione 21-acetate.
- 318. 19-chloro-Δ⁴,⁶-pregnadiene-11β,17α,21-triol-3,20-dione 21-acetate.
- 319. 19-chloro-16α-methyl-Δ⁴,⁶-pregnadiene-11β,17α,21-triol-3,20-dione 21-acetate.
- 320. 19-chloro-16β-methyl-Δ⁴,⁶-pregnadiene-11β,17α,21-triol-3,20-dione 21-acetate.

*Example XXI*

The compounds Nos. 305 to 312, inclusive, were treated in accordance with the foregoing example, thus affording respectively.

Cpd. No.:
- 321. 19-fluoro-Δ⁴,⁶-pregnadiene-17α,21-diol-3,11,20-trione 21-acetate.
- 322. 19-fluoro-16α,17α-isopropylidenedioxy-Δ⁴,⁶-pregnadien-21-ol-3,11,20-trione acetate.
- 323. 19-fluoro-16α-methyl-Δ⁴,⁶-pregnadiene-17α,21-diol-3,11,20-trione 21-acetate.
- 324. 19-fluoro-16β-methyl-Δ⁴,⁶-pregnadiene-17α,21-diol-3,11,20-trione 21-acetate.
- 325. 19-chloro-16α,17α-isopropylidenedioxy-Δ⁴,⁶-pregnadien-21-ol-3,11,20-trione acetate.
- 326. 19-chloro-Δ⁴,⁶-pregnadiene-17α,21-diol-3,11,20-trione 21-acetate.
- 327. 19-chloro-16α-methyl-Δ⁴,⁶-pregnadiene-17α,21-diol-3,11,20-trione 21-acetate.
- 328. 19-chloro-16β-methyl-Δ⁴,⁶-pregnadiene-17α,21-diol-3,11,20-trione 21-acetate.

*Example XXII*

The compounds Nos. 89 to 136, inclusive, and Nos. 193 to 304, inclusive, were treated following the procedure described in Example XX, thus affording the corresponding Δ⁴,⁶-derivatives.

*Example XXIII*

A mixture of 500 mg. of 19-fluoro-Δ⁴-pregnene-11β,17α,21-triol-3,20-dione 21-acetate (Cpd. No. 81) 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 19-fluoro-Δ¹,⁴-pregnadiene-11β,17α,21-triol-3,20-dione 21-acetate (Cpd. No. 329).

Following the same procedure, there were treated the compounds Nos. 82 to 88, inclusive, affording respectively.

Cpd. No.:
- 330. 19-fluoro-16α,17α-isopropylidenedioxy-Δ¹,⁴-pregnadiene-11β,21-diol-3,20-dione 21-acetate.
- 331. 19-fluoro-16α-methyl-Δ¹,⁴-pregnadiene-11β,17α,21-triol-3,20-dione 21-acetate.
- 332. 19-fluoro-16β-methyl-Δ¹,⁴-pregnadiene-11β,17α,21-triol-3,20-dione 21-acetate.
- 333. 19-chloro-16α,17α-isopropylidenedioxy-Δ¹,⁴-pregnadiene-11β,21-diol-3,20-dione 21-acetate.
- 334. 19-chloro-Δ¹,⁴-pregnadiene-11β,17α,21-triol-3,20-dione 21-acetate.
- 335. 19-chloro-16α-methyl-Δ¹,⁴-pregnadiene-11β,17α,21-triol-3,20-dione 21-acetate.
- 336. 19-chloro-16β-methyl-Δ¹,⁴-pregnadiene-11β,17α,21-triol-3,20-dione 21-acetate.

*Example XXIV*

The compounds Nos. 305 to 312, inclusive, were treated in accordance with the foregoing example, thus affording respectively.

Cpd. No.:
- 337. 19-fluoro-Δ¹,⁴-pregnadiene-17α,21-diol-3,11,20-trione 21-acetate.
- 338. 19-fluoro-16α,17α-isopropylidenedioxy-pregnadien-21-ol-3,11,20-trione acetate.
- 339. 19-fluoro-16α-methyl-Δ¹,⁴-pregnadiene-17α,21-diol-3,11,20-trione 21-acetate.
- 340. 19-fluoro-16β-methyl-Δ¹,⁴-pregnadiene-17α,21-diol-3,11,20-trione 21-acetate.
- 341. 19-chloro-16α,17α-isopropylidenedioxy-Δ¹,⁴-pregnadien-21-ol-3,11,20-trione acetate.
- 342. 19-chloro-Δ¹,⁴-pregnadiene-17α,21-diol-3,11,20-trione 21-acetate.
- 343. 19-chloro-16α-methyl-Δ¹,⁴-pregnadiene-17α,21-diol-3,11,20-trione 21-acetate.
- 344. 19-chloro-16β-methyl-Δ¹,⁴-pregnadiene-17α,21-diol-3,11,20-trione 21-acetate.

*Example XXV*

The compounds Nos. 89 to 136, inclusive, Nos. 193 to 304, inclusive, were treated following the procedure described in Example XXIII, thus affording the corresponding Δ¹,⁴-derivatives.

Example XXVI

The compounds Nos. 313 to 328, inclusive, were treated in accordance with Example XXIII, thus furnishing respectively.

Cpd. No.:
345. 19-fluoro-$\Delta^{1,4,6}$-pregnatriene-11$\beta$,17$\alpha$,21-triol-3,20-dione 21-acetate.
346. 19-fluoro-16$\alpha$,17$\alpha$-isopropylidenedioxy-$\Delta^{1,4,6}$-pregnatriene-11$\beta$,21-diol-3,20-dione 21-acetate.
347. 19-fluoro-16$\alpha$-methyl-$\Delta^{1,4,6}$-pregnatriene-11$\beta$,17$\alpha$-triol-3,20-dione 21-acetate.
348. 19-fluoro-16$\beta$-methyl-$\Delta^{1,4,6}$-pregnatriene-11$\beta$,17$\alpha$-triol-3,20-dione 21-acetate.
349. 19-chloro-16$\alpha$,17$\alpha$-isopropylidenedioxy-$\Delta^{1,4,6}$-pregnatriene-11$\beta$,21-diol-3,20-dione 21-acetate.
350. 19-chloro-$\Delta^{1,4,6}$-pregnatriene-11$\beta$,17$\alpha$,21-triol-3,20-dione 21-acetate.
351. 19-chloro-16$\alpha$-methyl-$\Delta^{1,4,6}$-pregnatriene-11$\beta$,17$\alpha$,21-triol-3,20-dione 21-acetate.
352. 19-chloro-16$\beta$-methyl-$\Delta^{1,4,6}$-pregnatriene-11$\beta$,17$\alpha$,21-triol-3,20-dione 21-acetate.
353. 19-fluoro-$\Delta^{1,4,6}$-pregnatriene-17$\alpha$,21-diol-3,11,20-trione 21-acetate.
354. 19-fluoro-16$\alpha$,17$\alpha$-isopropylidenedioxy-$\Delta^{1,4,6}$-pregnatriene-21-ol-3,11,20-trione acetate.
355. 19-fluoro-16$\alpha$-methyl-$\Delta^{1,4,6}$-pregnatriene-17$\alpha$,21-diol-3,11,20-trione 21-acetate
356. 19-fluoro-16$\beta$-methyl-$\Delta^{1,4,6}$-pregnatriene-17$\alpha$,21-diol-3,11,20-trione 21-acetate.
357. 19-chloro-16$\alpha$,17$\alpha$-isopropylidenedioxy-$\Delta^{1,4,6}$-pregnatriene-21-ol-3,11,20-trione acetate.
358. 19-chloro-$\Delta^{1,4,6}$-pregnatriene-17$\alpha$,21-diol-3,11,20-trione 21-acetate.
359. 19-chloro-16$\alpha$-methyl-$\Delta^{1,4,6}$-pregnatriene-17$\alpha$,21-diol-3,11,20-trione 21-acetate.
360. 19-chloro-16$\beta$-methyl-$\Delta^{1,4,6}$-pregnatriene-17$\alpha$,21-diol-3,11,20-trione 21-acetate.

Example XXVII

The final compounds of Example XXII were treated in accordance with Example XXIII, thus affording the corresponding $\Delta^{1,4,6}$-derivatives.

Example XXVIII 2 g. of 19-fluoro-$\Delta^4$-pregnene-11$\beta$,17$\alpha$,21-triol-3,20-dione 21-acetate (Cpd. No. 81), was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 19-fluoro-$\Delta^4$-pregnene-11$\beta$,17$\alpha$,21-triol-3,20-dione (Cpd. No. 361).

Following the same procedure, there were treated compounds Nos. 82 to 88, inclusive, thus yielding respectively.

Cpd. No.:
362. 19-fluoro-16$\alpha$,17$\alpha$-isopropylidenedioxy-$\Delta^4$-pregnene-11$\beta$,21-diol-3,20-dione.
363. 19-fluoro-16$\alpha$-methyl-$\Delta^4$-pregnene-11$\beta$,17$\alpha$,21-triol-3,20-dione.
364. 19-fluoro-16$\beta$-methyl-$\Delta^4$-pregnene-11$\beta$,17$\alpha$,21-triol-3,20-dione.
365. 19-chloro-16$\alpha$,17$\alpha$-isopropylidenedioxy-$\Delta^4$-pregnene-11$\beta$,21-diol-3,20-dione.
366. 19-chloro-$\Delta^4$-pregnene-11$\beta$,17$\alpha$,21-triol-3,20-dione.
367. 19-chloro-16$\alpha$-methyl-$\Delta^4$-pregnene-11$\beta$,17$\alpha$,21-triol-3,20-dione.
368. 19-chloro-16$\beta$-methyl-$\Delta^4$-pregnene-11$\beta$,17$\alpha$,21-triol-3,20-dione.

Example XXIX

The compounds Nos. 305 to 312, inclusive, were treated following the procedure of Example XXVIII, thus affording respectively.

Cpd. No.:
369. 19-fluoro-$\Delta^4$-pregnene-17$\alpha$,21-diol-3,11,20-trione.
370. 19-fluoro-16$\alpha$,17$\alpha$-isopropylidenedioxy-$\Delta^4$-pregnen-21-ol-3,11,20-trione.
371. 19-fluoro-16$\alpha$-methyl-$\Delta^4$-pregnene-17$\alpha$,21-diol-3,11,20-trione.
372. 19-fluoro-16$\beta$-methyl-$\Delta^4$-pregnene-17$\alpha$,21-diol-3,11,20-trione.
373. 19-chloro-16$\alpha$,17$\alpha$-isopropylidenedioxy-$\Delta^4$-pregnen-21-ol-3,11,20-trione.
374. 19-chloro-$\Delta^4$-pregnene-17$\alpha$,21-diol-3,11,20-trione.
375. 19-chloro-16$\alpha$-methyl-$\Delta^4$-pregnene-17$\alpha$,21-diol-3,11,20-trione.
376. 19-chloro-16$\beta$-methyl-$\Delta^4$-pregnene-17$\alpha$,21-diol-3,11,20-trione.

Example XXX

The compounds Nos. 105 to 136, inclusive, Nos. 193 to 200, inclusive, Nos. 217 to 256, inclusive, and Nos. 273 to 304, inclusive, were treated in accordance with Example XXVIII, thus producing the corresponding 21-free alcohols.

Example XXXI

The compounds Nos. 314 to 360, inclusive, were treated following the procedure described in Example XXIX, thus yielding respectively.

Cpd. No.:
377. 19-fluoro-16$\alpha$,17$\alpha$-isopropylidenedioxy-$\Delta^{4,6}$-pregnadiene-11$\beta$,21-diol-3,20-dione.
378. 19-fluoro-16$\alpha$-methyl-$\Delta^{4,6}$-pregnadiene-11$\beta$,17$\alpha$,21-triol-3,20-dione.
379. 19-fluoro-16$\beta$-methyl-$\Delta^{4,6}$-pregnadiene-11$\beta$,17$\alpha$,21-triol-3,20-dione.
380. 19-chloro-16$\alpha$,17$\alpha$-isopropylidenedioxy-$\Delta^{4,6}$-pregnadiene-11$\beta$,21-diol-3,20-dione.
381. 19-chloro-$\Delta^{4,6}$-pregnadiene-11$\beta$,17$\alpha$,21-triol-3,20-dione.
382. 19-chloro-16$\alpha$-methyl-$\Delta^{4,6}$-pregnadiene-11$\beta$,17$\alpha$,21-triol-3,20-dione.
383. 19-chloro-16$\beta$-methyl-$\Delta^{4,6}$-pregnadiene-11$\beta$,17$\alpha$,21-triol-3,20-dione.
384. 19-fluoro-$\Delta^{4,6}$-pregnadiene-17$\alpha$,21-diol-3,11,20-trione.
385. 19-fluoro-16$\alpha$,17$\alpha$-isopropylidenedioxy-$\Delta^{4,6}$-pregnadien-21-ol-3,11,20-trione.
386. 19-fluoro-16$\alpha$-methyl-$\Delta^{4,6}$-pregnadiene-17$\alpha$,21-diol-3,11,20-trione.
387. 19-fluoro-16$\beta$-methyl-pregnadiene-17$\alpha$,21-diol-3,11,20-trione.
388. 19-chloro-16$\alpha$,17$\alpha$-isopropylidenedioxy-$\Delta^{4,6}$-pregnadien-21-ol-3,11,20-trione.
389. 19-chloro-$\Delta^{4,6}$-pregnadiene-17$\alpha$,21-diol-3,11,20-trione.
390. 19-chloro-16$\alpha$-methyl-$\Delta^{4,6}$-pregnadiene-17$\alpha$,21-diol-13,11,20-trione.
391. 19-chloro-16$\beta$-methyl-$\Delta^{4,6}$-pregnadiene-17$\alpha$,21-diol-3,11,20-trione.
392. 19-fluoro-$\Delta^{1,4}$-pregnadiene-11$\beta$,17$\alpha$,21-triol-3,20-dione.
393. 19-fluoro-16$\alpha$,17$\alpha$-isopropylidenedioxy-$\Delta^{1,4}$-pregnadiene-11$\beta$,21-diol-3,20-dione.

394. 19-flouoro-16α-methyl-Δ$^{1,4}$-pregnadiene-11β, 17α, 21-triol-3,20-dione.
395. 19-fluoro-16β-methyl-Δ$^{1,4}$-pregnadiene-11β, 17α,21-triol-3,20-dione.
396. 19-chloro-16α,17α-isopropylidenedioxy-Δ$^{1,4}$-pregnadiene-11β,21-diol-3,20-dione.
397. 19-chloro-Δ$^{1,4}$-pregnadiene-11β,17α,21-triol-3,20-dione.
398. 19-chloro-16α-methyl-Δ$^{1,4}$-pregnadiene-11β, 17α,21-triol-3,20-dione.
399. 19-chloro-16β-methyl-Δ$^{1,4}$-pregnadiene-11β, 17α,21-triol-3,20-dione.
400. 19-fluoro-Δ$^{1,4}$-pregnadiene-17α,21-diol-3,11, 20-trione.
401. 19-fluoro-16α,17α-isopropylidenedioxy-Δ$^{1,4}$-pregnadien-21-ol-3,11,20-trione.
402. 19-fluoro-16α,methyl-Δ$^{1,4}$-pregnadiene-17α,21-diol-3,11,20-trione.
403. 19-fluoro-16β-methyl-Δ$^{1,4}$-pregnadiene-17α,21-diol-3,11,20-trione.
404. 19-chloro-16α,17α-isopropylidenedioxyΔ$^{1,4}$-pregnadien-21-ol-3,11,20-trione.
405. 19-chloro-Δ$^{1,4}$-pregnadiene-17α,21-diol-3,11, 20-trione.
406. 19-chloro-16α-methyl-Δ$^{1,4}$-pregnadiene-17α, 21-diol-3,11,20-trione.
407. 19-chloro-16β-methyl-Δ$^{1,4}$-pregnadiene-17α, 21-diol-3,11,20-trione.
408. 19-fluoro-Δ$^{1,4,6}$-pregatriene-11β,17α,21-triol-3,20-dione.
409. 19-fluoro-16α,17α-isopropylidenedioxy-Δ$^{1,4,6}$-pregnatriene-11β,21-diol-3,20-dione.
410. 19-fluoro-16α-methyl-Δ$^{1,4,6}$-pregnatriene-11β, 17α,21-triol-3,20-dione.
411. 19-fluoro-16β-methyl-Δ$^{1,4,6}$-pregnatriene-11β, 17α,21-triol-3,20-dione.
412. 19-chloro-16α,17α-isopropylidenedioxy-Δ$^{1,4,6}$-pregnatriene-11β,21-diol-3,20-dione.
413. 19-chloro-Δ$^{1,4,6}$-pregnatriene-11β,17α,21-triol-3,20-dione.
414. 19-chloro-16α-methyl-Δ$^{1,4,6}$-pregnatriene-11β, 17α,21-triol-3,20-dione.
415. 19-chloro-16β-methyl-Δ$^{1,4,6}$-pregnatriene-11β, 17α,21-triol-3,20-dione.
416. 19-fluoro-Δ$^{1,4,6}$-pregnatriene-17α,21-diol-3,11, 20-trione.
417. 19-fluoro-16α,17α-isopropylidenedioxy-16α, 17α-isopropylidenedioxy-Δ$^{1,4,6}$-pregnatriene-21-ol-3,11,20-trione.
418. 19-fluoro-16α-methyl-Δ$^{1,4,6}$-pregnatriene-17α, 21-diol-3,11,20-trione.
419. 19-fluoro-16β-methyl-Δ$^{1,4,6}$-pregnatriene-17α, 21-diol-3,11,20-trione.
420. 19-chloro-16α,17α-isopropylidenedioxy-Δ$^{1,4,6}$-pregnatriene-21-ol-3,11,20-trione.
421. 19-chloro-Δ$^{1,4,6}$-pregnatriene-17α,21-diol-3, 11,20-trione.
422. 19-chloro-16α-methyl-Δ$^{1,4,6}$-pregnatriene-17α, 21-diol-3,11,20-trione.
423. 19-chloro-16β-methyl-Δ$^{1,4,6}$-pregnatriene-17α, 21-diol-3,11,20-trione.

*Example XXXII*

A mixture of 1 g. of 19-fluoro-6β-methyl-Δ$^4$-pregnene-11β,17α,21-triol-3,20-dione (Cpd. No. 89) 4 cc. of pyridine and 2 cc. of acetic anhydride was kept at room temperature overnight, poured into ice water, the formed precipitate was filtered, washed with water and dried. Crystallization from acetone-hexane gave the 21-acetate of 10-fluoro-6β-methyl-Δ$^4$-pregnene-11β,17α,21-triol-3,20-dione (Cpd. No. 424).

The compounds Nos. 90 to 104, inclusive, were treated by the same procedure, thus yielding the corresponding 21-acetates.

*Example XXXIII*

Upon treatment of compound Nos. 89 to 104, inclusive, by the procedure described in Example XXXII, except that acetic anhydride was substituted by propionic anhydride and caproic anhydride, there were respectively produced the corresponding 21-propionates and 21-caproates.

*Example XXXIV*

1 g. of 19-fluoro-16α,17α-isopropylidenedioxy-Δ$^4$-pregnene-11β,21-diol-3,20-dione 21-acetate (Cpd. No. 82), was heated on the steam bath with 20 cc. of 60% formic acid for 1 hour, cooled, diluted with water and the precipitate was collected, washed with water, dried, and recrystallized from acetone-hexane, thus affording 19-fluoro-Δ$^4$-pregnene-11β,16α,17α,21-tetrol-3,20-dione 21-acetate (Cpd. No. 425).

Following the same procedure, there were treated the compounds Nos. 85, 98, 101, 106, 109, 114 and 117, thus affording respectively.

Cpd. No.:
    426. 19-chloro-Δ$^4$-pregnene-11β,16α,17α,21-tetrol-3,20-dione 21-acetate.
    427. 19-fluoro-6α-methyl-Δ$^4$-pregnene-11β,16α,17α, 21-tetrol-3,20-dione.
    428. 19-chloro-6α-methyl-Δ$^4$-pregnene-11β,16α,17α, 21-tetrol-3,20-dione.
    429. 6α-chloro-19-fluoro-Δ$^4$-pregnene-11β,16α,17α-21-tetrol-3,20-dione 21-acetate.
    430. 6α,19-dichloro-Δ$^4$-pregnene-11β,16α,17α,21-tetrol-3,20-dione 21-acetate.
    431. 6α,19-difluoro-Δ$^4$-pregnene-11β,16α,17α,21-tetrol-3,20-dione 21-acetate.
    432. 6α-fluoro-19-chloro-Δ$^4$-pregnene-11β,16α,17α, 21-tetrol-3,20-dione 21-acetate.

*Example XXXV*

The compounds Nos. 194, 197, 210, 213, 218 and 221, were treated following the procedure described in Example XXXIV, thus affording respectively.

Cpd. No.:
    433. 9α,19-difluoro-Δ$^4$-pregnene-11β,16α,17α,21-tetrol-3,20-dione 21-acetate.
    434. 9α-fluoro-19-chloro-Δ$^4$-pregnene-11β,16α,17α, 21-tetrol-3,20-dione 21-acetate.
    435. 9α,19-difluoro-6α-methyl-Δ$^4$-pregnene-11β,16α, 17α,21-tetrol-3,20-dione.
    436. 9α-fluoro-19-chloro-6α-methyl-Δ$^4$-pregnene-11β,16α,17α,21-tetrol-3,20-dione.
    437. 6α-chloro-9α,19-difluoro-Δ$^4$-pregnene-11β,16α, 17α,21-tetrol-3,20-dione 21-acetate.
    438. 9α-fluoro-6α,19-dichloro-Δ$^4$-pregnene-11β-16α, 17α,21-tetrol-3,20-dione 21-acetate.

*Example XXXVI*

The compounds Nos. 425, 426, 429, 430, 431 and 432, were treated following the procedure of Example XXVIII, thus affording respectively.

Cpd. No.:
    439. 19-fluoro-Δ$^4$-pregnene-11β,16α,17α,21-tetrol-3,20-dione.
    440. 19-chloro-Δ$^4$-pregnene-11β,16α,17α,21-tetrol-3,20-dione.
    441. 6α-chloro-19-fluoro-Δ$^4$-pregnene-11β,16α,17α, 21-tetrol-3,20-dione.
    442. 6α,19-dichloro-Δ$^4$-pregnene-11β,16α,17α,21-tetrol-3,20-dione.
    443. 6α,19-difluoro-Δ$^4$-pregnene-11β,16α,17α,21-tetrol-3,20-dione.
    444. 6α-fluoro-19-chloro-Δ$^4$-pregnene-11β,16α,17α, 21-tetrol-3,20-dione.

Example XXXVII

The compounds Nos. 425 to 432, inclusive, were treated by the method of Example XXXII, thus affording respectively.

Cpd. No.:
- 445. 19-fluoro-Δ⁴-pregnene-11β,16α,17α,21-tetrol-3,20-dione 16,21-diacetate.
- 446. 19-chloro-Δ⁴-pregnene-11β,16α,-17α,21-tetrol-3,20-dione 16,21-diacetate.
- 447. 19-fluoro-6α-methyl-Δ⁴-pregnene-11β,16α,17α, 21-tetrol-3,20-dione 16,21-diacetate.
- 448. 19-chloro-6α-methyl-Δ⁴-pregnene-11β,16α, 17α,21-tetrol-3,20-dione 16,21-diacetate.
- 449. 6α-chloro-19-fluoro-Δ⁴-pregnene-11β,16α,17α, 21-tetrol-3,20-dione 16,21-diacetate.
- 450. 6α,19-dichloro-Δ⁴-pregnene-11β,16α,17α,21-tetrol-3,20-dione 16,21-diacetate.
- 451. 6α,19-difluoro-Δ⁴-pregnene-11β,16α,17α,21-tetrol-3,20-dione 16,21-diacetate.
- 452. 6α-fluoro-19-chloro-Δ⁴-pregnene-11β,16α,17α, 21-tetrol-3,20-dione 16,21-diacetate.

Example XXXVIII

A cooled solution of 4 g. of 19-fluoro-Δ⁴-10α-pregnen-17α-ol-3,20-dione (obtained according to my copending U.S. patent application Serial No. 328,474, filed December 6, 1963), in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the corresponding 21-iodo derivative. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 19-fluoro-Δ⁴-10α-pregnene-17α,21-diol-3,20-dione 21-acetate (compound No. 453).

Following the same procedure, the starting compounds listed under A (obtained in accordance with the aforesaid patent application) were converted into the corresponding products set forth under B.

| A | Cpd. No. | B |
|---|---|---|
| 19-fluoro-16α,17α-isopropylidenedioxy-Δ⁴-10α-pregnene-3,20-dione. | 454 | 19-fluoro-16α,17α-isopropylidenedioxy-Δ⁴-10α-pregnen-21-ol-3,20-dione acetate. |
| 19-fluoro-16α-methyl-Δ⁴-10α-pregnen-17α-ol-3,20-dione. | 455 | 19-fluoro-16α-methyl-Δ⁴-10α-pregnene-17α,21-diol-3,20-dione 21-acetate. |
| 19-fluoro-16β-methyl-Δ⁴-10α-pregnen-17α-ol-3,20-dione. | 456 | 19-fluoro-16β-methyl-Δ⁴-10α-pregnene-17α,21-diol-3,20-dione 21-acetate. |
| 19-chloro-16α,17α-isopropylidenedioxy-Δ⁴-10α-pregnene-3,20-dione. | 457 | 19-chloro-16α,17α-isopropylidenedioxy-Δ⁴-10α-pregnen-21-ol-3,20-dione acetate. |
| 19-chloro-Δ⁴-10α-pregnen-17α-ol-3,20-dione. | 458 | 19-chloro-Δ⁴-10α-pregnene-17α,21-diol-3,20-dione 21-acetate. |
| 19-chloro-16α-methyl-Δ⁴-10α-pregnen-17α-ol-3,20-dione. | 459 | 19-chloro-16α-methyl-Δ⁴-10α-pregnene-17α,21-diol-3,20-dione 21-acetate. |
| 19-chloro-16β-methyl-Δ⁴-10α-pregnen-17α-ol-3,20-dione. | 460 | 19-chloro-16β-methyl-Δ⁴-10α-pregnene-17α,21-diol-3,20-dione 21-acetate. |

Example XXXIX

A mixture of 5 g. of 19-fluoro-Δ⁴-10α-pregnene-17α,21-diol-3,20-dione 21-acetate (Cpd. No. 453) 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3,20-biscycloethylenedioxy-19-fluoro-Δ⁵-10α-pregnene-17α,21-diol 21-acetate (Cpd. No. 461).

The compounds Nos. 454 to 460, inclusive, were treated by the above procedure, thus affording respectively.

Cpd. No.:
- 462. 3,20-biscycloethylenedioxy-19-fluoro-16α,17α-isopropylidenedioxy-Δ⁵-10α-pregnen-21-ol-acetate.
- 463. 3,20-biscycloethylenedioxy-19-fluoro-16α-methyl-Δ⁵-10α-pregnene-17α,21-diol 21-acetate.
- 464. 3,20-biscycloethylenedioxy-19-fluoro-16β-methyl-Δ⁵-10α-pregnene-17α,21-diol 21-acetate.
- 465. 3,20-biscycloethylenedioxy-19-chloro-16α, 17α-isopropylidenedioxy-Δ⁵-10α-pregnen-21-ol acetate.
- 466. 3,20-biscycloethylenedioxy-19-chloro-Δ⁵-10α-pregnene-17α,21-diol 21-acetate.
- 467. 3,20-biscycloethylenedioxy-19-chloro-16α-methyl-Δ⁵-10α-pregnene-17α,21-diol 21-acetate.
- 468. 3,20-biscycloethylenedioxy-19-chloro-16β-methyl-Δ⁵-10α-pregnene-17α,21-diol-21-acetate.

Example XL

A solution of 2.5 g. of 3,20-biscycloethylenedioxy-19-fluoro-Δ⁵-10α-pregnene-17α,21-diol 21-acetate (Cpd. No. 461) in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3,20-biscycloethylenedioxy-19-fluoro-5α,6α-oxido-10α-pregnane-17α, 21-diol 21-acetate (Cpd. No. 469).

When applying the same procedure to compounds Nos. 462 to 468, inclusive, there were respectively obtained:

Cpd. No.:
- 470. 3,20-biscycloethylenedioxy-19-fluoro-16α,17α-isopropylidenedioxy-5α,6α-oxido-10α-pregnan-21-ol acetate.
- 471. 3,20-biscycloethylenedioxy-19-fluoro-16α-methyl-5α,6α-oxido-10α-pregnane-17α,21-diol 21-acetate.
- 472. 3,20-biscycloethylenedioxy-19-fluoro-16β-methyl-5α,6α-oxido-10α-pregnane-17α,21-diol 21-acetate.
- 473. 3,20-biscycloethylenedioxy-19-chloro-16α,17α-isopropylidenedioxy-5α,6α-oxido-10α-pregnan-21-ol acetate.
- 474. 3,20-biscycloethylenedioxy-19-chloro-5α,6α-oxido-10α-pregnane-17α,21-diol 21-acetate.
- 475. 3,20-biscycloethylenedioxy-19-chloro-16α-methyl-5α,6α-oxido-10α-pregnane-17α,21-diol 21-acetate.
- 476. 3,20-biscycloethylenedioxy-19-chloro-16β-methyl-5α,6α-oxido-10α-pregnane-17α,21-diol 21-acetate.

Example XLI

To a solution of 40 cc. of 4 N methylmagnesium bromide in ether was added, with stirring, a solution of 2 g. of 3,20-biscycloethylenedioxy-19-fluoro-5α,6α-oxido-10α-pregnane-17α,21-diol 21-acetate (Cpd. No. 469) in 60 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 400 cc. of a saturated solution of ammonium chloride was added slowly to the cooled mixture which was then stirred for 15 minutes before transfer to a separatory funnel. The tetrahydrofuran layer was separated, dried and evaporated to dryness.

A solution of the resulting residue in 70 cc. of methanol and 7 cc. of 8% aqueous sulfuric acid was refluxed for 40 minutes. It was then neutralized with saturated sodium carbonate solution, concentrated to ca. 20 cc. of vacuo and poured into water. The formed precipitate was filtered off, washed thoroughly with water and dried.

A solution of the dry precipitate 7 cc. of dry pyridine was cooled to —10° C. treated with 0.4 cc. of thionyl chloride and the mixture allowed to stand for 4 minutes at this temperature. Ice-water was added and the crystalline precipitate was filtered, washed and dried, yielding 19-fluoro - 6β - methyl - Δ⁴ - 10α-pregnene-17α,21-diol-3,20-dione (Cpd. No. 477).

The compounds Nos. 470 to 476, inclusive, were treated by the above method, thus affording respectively.

Cpd. No.:
478. 19-fluoro-16α,17α-isopropylidenedioxy-6β-methyl-Δ⁴-10α-pregnen-21-ol-3,20-dione.
479. 19-fluoro-6β,16α-dimethyl-Δ⁴-10α-pregnene-17α,21-diol-3,20-dione.
480. 19-fluoro-6β,16β-dimethyl-Δ⁴-10α-pregnene-17α,21-diol-3,20-dione.
481. 19-chloro-16α,17α-isopropylidenedioxy-6β-methyl-Δ⁴-10α-pregnen-21-ol-3,20-dione.
482. 19-chloro-6β-methyl-Δ⁴-10α-pregnene-17α,21-diol-3,20-dione.
483. 19-chloro-6β,16α-dimethylΔ⁴-10α-pregnene-17α,21-diol-3,20-dione.
484. 19-chloro-6β,16β-dimethyl-Δ⁴-10α-pregnene-17α,21-diol-3,20-dione.

*Example XLII*

A solution of 1 g. of 19-fluoro-6β-methyl-Δ⁴-10α-pregnene-17α,21-diol-3,20-dione (Cpd. No. 477) in 100 cc. of methanol and 50 cc. of 1 N aqueous sodium hydroxide was allowed to stand at room temperature under a nitrogen atmosphere for 24 hours. The solution was then concentrated under reduced pressure and without heating to half its volume, ice water was added and the crystalline precipitate filtered, washed and dried. Recrystallization from aqueous acetone gave, 19-fluoro-6α-methyl-Δ⁴-10α-pregnene-17α,21-diol - 3,20 - dione (Cpd. No. 485).

When applying the same procedure to compounds Nos. 478 to 484, inclusive, there were respectively produced.

Cpd. No.:
486. 19-fluoro-16α,17α-isopropylidenedioxy-6α-methyl-Δ⁴-10α-pregnen-21-ol-3,20-dione.
487. 19-fluoro-6α,16α-dimethyl-Δ⁴-10α-pregnene-17α,21-diol-3,20-dione.
488. 19-fluoro-6α,16β-dimethyl-Δ⁴-10α-pregnene-17α,21-diol-3,20-dione.
489. 19-chloro-16α,17α-isopropylidenedioxy-6α-methyl-Δ⁴-10α-pregnen-21-ol-3,20-dione.
490. 19-chloro-6α-methyl-Δ⁴-10α-pregnene-17α,21-diol-3,20-dione.
491. 19-chloro-6α,16α-dimethyl-Δ⁴-10α-pregnene-17α,21-diol-3,20-dione.

*Example XLIII*

Into a suspension of 1 g. of 3,20-biscycloethylenedioxy-19-fluoro-5α,6α-oxido-10α-pregnane-17α,21-diol 21-acetate (Cpd. No. 469) in 45 cc. of ethyl acetate was passed a slow stream of dry hydrochloric acid; after 10 minutes all the solid material was dissolved. The gas was passed through the reaction mixture for a total of 5 hours. The solution was washed abundantly with water, dried and evaporated to dryness. The residue was washed with water to neutrality and dried. Recrystallization from methylene chloride afforded 6α-chloro-19-fluoro-Δ⁴-10α-pregnene-17α,21-diol-3,20-dione 21-acetate (compound No. 493).

The compounds Nos. 18 to 24, inclusive, were treated by the above method, thus furnishing respectively.

Cpd. No.:
494. 6α-chloro-19-fluoro-16α,17α-isopropylidenedioxy-Δ⁴-10α-pregnen-21-ol-3,20-dione acetate.
495. 6α-chloro-19-fluoro-16α-methyl-Δ⁴-10α-pregnene-17α,21-diol-3,20-dione 21-acetate.
496. 6α-chloro-19-fluoro-16β-methyl-Δ⁴-10α-pregnene-17α,21-diol-3,20-dione 21-acetate.
497. 6α,19-dichloro-16α,17α-isopropylidenedioxy-Δ⁴-10α-pregnen-21-ol-3,20-dione acetate.
498. 6α,19-dichloro-Δ⁴-10α-pregnene-17α,21-diol-3,20-dione 21-acetate.
499. 6α,19-dichloro-16α-methyl-Δ⁴-10α-pregnene-17α,21-diol-3,20-dione 21-acetate.
500. 6α,19-dichloro-17β-methyl-Δ⁴-10α-pregnene-17α,21-diol-3,20-dione 21-acetate.

*Example XLIV*

2.8 cc. of boron trifluoride etherate was slowly added with stirring to 220 mg. of anhydrous hydrogen fluoride cooled in an acetone-Dry Ice bath.

To a solution of 1 g. of compound No. 469 of Example III in 10 cc. of a mixture of equal parts of benzene and ether was added 1.3 cc. of the fluoroboric acid reagent. The mixture was kept for 3 hours at room temperature, then washed four times with water, dried over anhydrous sodium sulfate and the solvent evaporated under reduced pressure. The residue was suspended in 40 cc. of ethylacetate and there was passed a slow stream of dry hydrochloric acid. The gas was passed through the reaction mixture for a total of 5 hours. The solution was then washed abundantly with water, dried and evaporated to dryness. The residue was washed with water to neutrality and dried. Recrystallization from methylene chloride hexane afforded 6α,19 - difluoro-Δ⁴-10α-pregnene-17α,21-diol-3,20-dione 21-acetate (Cpd. No. 501).

The compounds Nos. 470 to 476 inclusive, were treated following the same procedure, thus yielding respectively.

Cpd. No.:
502. 6α,19-difluoro-16α,17α-isopropylidenedioxy-Δ⁴-10α-pregnen-21-ol-3,20-dione acetate.
503. 6α,19-difluoro-16α-methyl-Δ⁴-10α-pregnene-17α,21-diol-3,20-dione 21-acetate.
504. 6α,19-difluoro-16β-methyl-Δ⁴-10α-pregnene-17α,21-diol-3,20-dione 21-acetate.
505. 6α-fluoro-19-chloro-16α,17α-isopropylidenedioxy-Δ⁴-10α-pregnen-21-ol-3,20-dione acetate.
506. 6α-fluoro-19-chloro-Δ⁴-10α-pregnene-17α,21-diol-3,20-dione 21-acetate.
507. 6α-fluoro-19-chloro-16α-methyl-Δ⁴-10α-pregnene-17α,21-diol-3,20-dione 21-acetate.
508. 6α-fluoro-19-chloro-16β-methyl-Δ⁴-10α-pregnene-17α,21-diol-3,20-dione 21-acetate.

*Example XLV*

A suspension of 5 g. of 19-fluoro-Δ⁴-10α-pregnene-17α,21-diol-3,20-dione 21-acetate (Cpd. No. 453) in 37.5 cc. of anhydrous peroxide-free dioxane was treated with 6.2 cc. of freshly distilled ethyl orthoformate and 2.5 g. of p-toluenesulfonic acid. The mixture was stirred at room temperature for 15 minutes and the resulting solution let stand for 30 minutes further. 4 cc. of pyridine were added and then water. The formed precipitate was collected by filtration, water washed and air dried. Recrystallization from acetone-hexane afforded 19-fluoro-3-ethoxy-Δ³,⁵-10α-pregnadiene-17α,21-diol-20-one 21-acetate (Cpd. No. 509).

By the same procedure, there were treated the compounds Nos. 454 to 460 inclusive, thus affording respectively.

Cpd. No.:
510. 19-fluoro-16α,17α-isopropylidenedioxy-3-ethoxy-Δ³,⁵-10α-pregnadien-21-ol-20-one acetate.
511. 19-fluoro-16α-methyl-3-ethoxy-Δ³,⁵-10α-pregnadiene-17α,21-diol-20-one 21-acetate.
512. 19-fluoro-16β-methyl-3-ethoxy-Δ³,⁵-10α-pregnadiene-17α,21-diol-20-one 21-acetate.
513. 19-chloro-16α,17α-isopropylidenedioxy-3-ethoxy-Δ³,⁵-10α-pregnadien-21-ol-20-one acetate.
514. 19-chloro-3-ethoxy-Δ³,⁵-10α-pregnadiene-17α,21-diol-20-one 21-acetate.
515. 19-chloro-16α-methyl-3-ethoxy-Δ³,⁵-10α-pregnadiene-17α,21-diol-20-one 21-acetate.
516. 19-chloro-16β-methyl-3-ethoxy-Δ³,⁵-10α-pregnadiene-17α,21-diol-20-one 21-acetate.

Example XLVI

A mixture of 5 g. of 19-fluoro-3-ethoxy-Δ³,⁵-10α-pregnadiene-17α,21-diol-20-one 21-acetate (Cpd. No. 509), 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vaccum and recrystallized from acetone thus giving 6β-chloro-19-fluoro-Δ⁴-10α-pregnene-17α,21-diol-3,20-dione 21-acetate (Cpd. No. 517).

The compounds Nos. 510 to 516, inclusive, were treated by the same procedure, affording respectively.

Cpd. No.:
518. 6β-chloro-19-fluoro-16α,17α-isopropylidenedioxy-Δ⁴-10α-pregnen-21-ol-3,20-dione acetate.
519. 6β-chloro-19-fluoro-16α-methyl-Δ⁴-10α-pregnene-17α,21-diol-3,20-dione 21-acetate.
520. 6β-chloro-19-fluoro-16β-methyl-Δ⁴-10α-pregnene-17α,21-diol-3,20-dione 21-acetate.
521. 6β,19-dichloro-16α,17α-isopropylidenedioxy-Δ⁴-10α-pregnen-21-ol-3,20-dione acetate.
522. 6β,19-dichloro-Δ⁴-10α-pregnene-17α,21-diol-3,20-dione 21-acetate.
523. 6β,19-dichloro-16α-methyl-Δ⁴-10α-pregnene-17α,21-diol-3,20-dione 21-acetate.
524. 6β-19-dichloro-16β-methyl-Δ⁴-10α-pregnene-17α,21-diol-3,20-dione 21-acetate.

Example XLVII 1 g. of 19-fluoro-3-ethoxy-Δ³,⁵-10α-pregnadiene-17α,21-diol-20-one 21-acetate (Cpd. No. 509) was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was obtained 6β,19-difluoro-Δ⁴-10α-pregnene-17α,21-diol-3,20-dione 21-acetate (Cpd. No. 525).

The compounds Nos. 510 to 516 inclusive, were treated following the same procedure, thus yielding respectively.

Cpd. No.:
526. 6β,19-difluoro-16α,17α-isopropylidenedioxy-Δ⁴-10α-pregnen-21-ol-3,20-dione acetate.
527. 6β,19-difluoro-16α-methyl-Δ⁴-10α-pregnene-17α,21-diol-3,20-dione 21-acetate.
528. 6β,19-difluoro-16β-methyl-Δ⁴-10α-pregnene-17α,21-diol-3,20-dione 21-acetate.
529. 6β-fluoro-19-chloro-16α,17α-isopropylidenedioxy-Δ⁴-10α-pregnen-21-ol-3,20-dione acetate.
530. 6β-fluoro-19-chloro-Δ⁴-10α-pregnene-17α,21-diol-3,20-dione 21-acetate.
531. 6β-fluoro-19-chloro-16-α-methyl-Δ⁴-10α-pregnene-17α,21-diol-3,20-dione 21-acetate.
532. 6β-fluoro-19-chloro-16β-methyl-Δ⁴-10α-pregnene-17α,21-diol-3,20-dione 21-acetate.

Example XLVIII

The following solutions "A," "B" and "C" were prepared using distilled water as solvent: solution "A" was prepared by mixing 425 cc. of a 1.74% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 19.1% magnesium sulfate, to a volume of 5 lt.; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

The defatted adrenal glands of recently slaughtered cattle, were ground in a meat grinder until an homogeneous mass was obtained; to 1 kg. of this mass was added 2 liters of the mixture of A, B and C solutions with vigorous stirring. To the mixture there was then added 1 g. of 19-fluoro-Δ⁴-10α-pregnene-17α,21-diol-3,20-dione 21-acetate (Cpd. No. 453), dissolved in 5.35 cc. of propylene glycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. Chromatography on alumina and crystallization of the solid fractions afforded 19-fluoro-Δ⁴-10α-pregnene-11β,17α,21-triol-3,20-dione 21-acetate (Cpd. No. 533).

The compounds Nos. 454 to 460 inclusive, were treated by the above procedure, thus affording respectively.

Cpd. No.:
534. 19-fluoro-16α,17α-isopropylidenedioxy-Δ⁴-10α-pregnene-11β,21-diol-3,20-dione 21-acetate.
535. 19-fluoro-16α-methyl-Δ⁴-10α-pregnene-11β,17α,21-triol-3,20-dione 21-acetate.
536. 19-fluoro-16β-methyl-Δ⁴-10α-pregnene-11β,17α,21-triol-3,20-dione 21-acetate.
537. 19-chloro-16α,17α-isopropylidenedioxy-Δ⁴-10α-pregnene-11β,21-diol-3,20-dione 21-acetate.
538. 19-chloro-Δ⁴-10α-pregnene-11β,17α,21-triol-3,20-dione 21-acetate.
539. 19-chloro-16α-methyl-Δ⁴-10α-pregnene-11β,17α,21-triol-3,20-dione 21-acetate.
540. 19-chloro-16β-methyl-Δ⁴-10α-pregnene-11β-17α,21-triol-3,20-dione 21-acetate.

Example XLIX

The compounds Nos. 477 to 508, inclusive, were treated following the procedure described in the foregoing example, thus affording respectively.

Cpd. No.:
541. 19-fluoro-6β-methyl-Δ⁴-10α-pregnene-11β,17α,21-triol-3,20-dione.
542. 19-fluoro-16α,17α-isopropylidenedioxy-6β-methyl-Δ⁴-10α-pregnene-11β,21-diol-3,20-dione.
543. 19-fluoro-6β,16α-dimethyl-Δ⁴-10α-pregnene-11β,17α,21-triol-3,20-dione.
544. 19-fluoro-6β,16β-dimethyl-Δ⁴-10α-pregnene-11β,17α,21-triol-3,20-dione.
545. 19-chloro-16α,17α-isopropylidenedioxy-6β-methyl-Δ⁴-10α-pregnene-11β,21-diol-3,20-dione.
546. 19-chloro-6β-methyl-Δ⁴-10α-pregnene-11β,17α,21-triol-3,20-dione.
547. 19-chloro-6β,16α-dimethyl-Δ⁴-10α-pregnene-11β,17α,21-triol-3,20-dione.

Cpd. No.:
548. 19 - chloro - 6β,16β-dimethyl-Δ⁴-10α-pregnene-11β,17α,21-triol-3,20-dione.
549. 19 - fluoro - 6α - methyl - Δ⁴ - 10α - pregnene-11β,17α,21-triol-3,20-dione.
550. 19 - fluoro - 16α,17α - isopropylidenedioxy - 6α-methyl-Δ⁴-10α-pregnene-11β,21-diol-3,20-dione.
551. 19 - fluoro - 6α,16α - dimethyl-Δ⁴-10α-pregnene-11β,17α,21-triol-3,20-dione.
552. 19 - fluoro - 6α,16β - dimethyl-Δ⁴-10α-pregnene-11β,17α,21-triol-3,20-dione.
553. 19 - chloro - 16α,17α - isopropylidenedioxy-6α-methyl-Δ⁴-10α-pregnene-11β,21-diol-3,20-dione.
554. 19 - chloro - 6α - methyl - Δ⁴ - 10α - pregnene-11β,17α21-triol-3,20-dione.
555. 19 - chloro - 6α,16α - dimethyl-Δ⁴-10α-pregnene-11β,17α,21-triol-3,20-dione.
556. 19 - chloro - 6α,16β - dimethyl-Δ⁴-10α-pregnene-11β,17α,21-triol-3,20-dione.
557. 6α - chloro - 19 - fluoro - Δ⁴ - 10α - pregnene-11β,17α,21-triol-3,20-dione, 21-acetate.
558. 6α - chloro - 19-fluoro-16α,17α-isopropylidenedioxy - Δ⁴-10α-pregnene-11β,21-diol-3,20-dione 21-acetate.
559. 6α - chloro - 19-fluoro-16α-methyl-Δ⁴-10α-pregnene-11β,17α,21-triol-3,20-dione 21-acetate.
560. 6α - chloro - 19-fluoro-16β-methyl-Δ⁴-10α-pregnene-11β,17α,21-triol-3,20-dione 21-acetate.
561. 6α,19 - dichloro - 16α,17α-isopropylidenedioxy-Δ⁴-10α-pregnene-11β,21-diol-3,20-dione 21-acetate.
562. 6α,19 - dichloro - Δ⁴ - 10α-pregnene-11β,17α,21-triol 3,20-dione 21-acetate.
563. 6α,19 - dichloro - 16α-methyl-Δ⁴-10α-pregnene-11β,17α,21-triol-3,20-dione 21-acetate.
564. 6α,19 - dichloro - 16β-methyl-Δ⁴-10α-pregnene-11β,17α,21-triol-3,20-dione 21-acetate.
565. 6α,19-difluoro-Δ⁴-10α-pregnene-11β,17α,21-triol-3,20-dione 21-acetate.
566. 6α,19-difluoro-16α,17α-isopropylidenedioxy-Δ⁴-10α-pregnene-11β,21-diol-3,20-dione 21-acetate.
567. 6α,19-difluoro-16α-methyl-Δ⁴-10α-pregnene-11β-17α,21-triol-3,20-dione 21-acetone.
568. 6α,19-difluoro-16β-methyl-Δ⁴-10α-pregnene-11β,17α,21-triol-3,20-dione 21-acetate.
569. 6α-fluoro-19-chloro-16α,17α-isopropylidenedioxy-Δ⁴-10α-pregnene-11β,21-diol-3,20-dione 21-acetate.
570. 6α-fluoro-19-chloro-Δ⁴-10α-pregnene-11β,17α,21-triol-3,20-dione 21-acetate.
571. 6α-fluoro-19-chloro-16α-methyl-Δ⁴-10α-pregnene-11β,17α,21-triol-3,20-dione 21-acetate.
572. 6α-fluoro-19-chloro-16β-methyl-Δ⁴-10α-pregnene-11β,17α,21-triol-3,20-dione 21-acetate.

*Example L*

The compounds Nos. 517 to 532, inclusive, were treated in accordance with the procedure described in Example XLVIII, thus affording respectively.

Cpd. No.:
573. 6β-chloro-19-fluoro-Δ⁴-10α-pregnene-11β,17α,21-triol-3,20-dione 21-acetate.
574. 6β-chloro-19-fluoro-16α,17α-isopropylidenedioxy-Δ⁴-10α-pregnene-11β,21-diol-3,20-dione 21-acetate.
575. 6β-chloro-19-fluoro-16α-methyl-Δ⁴-10α-pregnene-11β,17α,21-triol-3,20-dione 21-acetate.
576. 6β-chloro-19-fluoro-16β-methyl-Δ⁴-10α-pregnene-11β,17α,21-triol-3,20-dione 21-acetate.
577. 6β,19-chloro-16α,17α-isopropylidenedioxy-Δ⁴-10α-pregnene-11β,21-diol-3,20-dione 21-acetate.
578. 6β,19-dichloro-Δ⁴-10α-pregnene-11β,17α,21-triol-3,20-dione 21-acetate.

Cpd. No.:
579. 6β,19-dichloro-16α-methyl-Δ⁴-10α-pregnene-11β,17α,21-triol-3,20-dione 21-acetate.
580. 6β,19-dichloro-16β-methyl-Δ⁴-10α-pregnene-11β,17α,21-triol-3,20-dione 21-acetate.
581. 6β,19-difluoro-Δ⁴-10α-pregnene-11β,17α,21-triol-3,20-dione 21-acetate.
582. 6β,19-difluoro-16α,17α-isopropylidenedioxy-Δ⁴-10α-pregnene-11β,21diol-3,20-dione 21-acetate.
583. 6β,19-difluoro-16α-methyl-Δ⁴-10α-pregnene-11β,17α,21-triol-3,20-dione 21-acetate.
584. 6β,19-difluoro-16β-methyl-Δ⁴-10α-pregnene-11β,17α,21-triol-3,20-dione 21-acetate.
585. 6β-fluoro-19-chloro-16α,17α-isopropylidenedioxy-Δ⁴-10α,pregnene-11β,21-diol-3,20-dione 21-acetate.
586. 6β-fluoro-19-chloro-Δ⁴-10α-pregnene-11β,17α,21-triol-3,20-dione 21-acetate.
587. 6β-fluoro-19-chloro-16α-methyl-Δ⁴-10α-pregnene-11β,17α,21-triol-3,20-dione 21-acetate.
588. 6β-fluoro-19-chloro-16β-methyl-Δ⁴-10α-pregnene-11β,17α,21-triol-3,20-dione 21-acetate.

*Example LI*

5 g. of 19-fluoro-Δ⁴-10α - pregnene - 11β,17α,21 - triol-3,20-dione 21-acetate (Cpd. No. 533), was dissolved with slow heating in 72.5 cc. of dimethyl-formamide, the mixture was cooled, 2.1 g. of mesyl chloride and 2.5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 19-fluoro-Δ⁴,⁹⁽¹¹⁾-10α-pregnadiene-17α,21-diol-3,20-dione 21-acetate 2.8 g. of N-bromoacetamide were added to a mixture of 5 g. of the latter steroid, 50 cc. of pure dioxane and 0.8 cc. of 0.4 N perchloric acid while stirring in the dark and at room temperature during 1 hour. The reaction mixture was stirred for 1 hour further, a solution of 10% sodium sulfite was then added until the potassium-iodide-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained the corresponding 9α-bromo-11β-ol derivative.

A mixture of 2 g. of anhydrous potassium acetate and 20 cc. of acetone was heated almost to boiling and then a solution of 1.7 g. of the bromohydrin in 20 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-benzene there was obtained 19-fluoro-9β,11β-oxido-Δ⁴-10α-pregnene-17α,21-diol-3,20-dione 21-acetate (Cpd. No. 589).

Following exactly the same procedures, the compounds Nos. 534 to 588, inclusive, were successively converted into the corresponding Δ⁴,⁹⁽¹¹⁾-pregnadiene derivatives, the corresponding Δ⁴-9α-bromo-11β-ols and then respectively into the following oxido compounds:

Cpd. No.:
590. 19-fluoro-9β,11β-oxido-16α,17α-isopropylidenedioxy-Δ⁴-10α-pregnen-21-ol-3,20-dione 21-acetate.
591. 19-fluoro-9β,11β-oxido-16α-methyl-Δ⁴-10α-pregnene-17α,21-diol-3,20-dione 21-acetate.
592. 19-fluoro-9β,11β-oxido-16β-methyl-Δ⁴-10α-pregnene-17α,21-diol-3,20-dione 21-acetate.
593. 19-chloro-9β,11β-oxido-16α,17α-isopropylidenedioxy-Δ⁴-10α-pregnen-21-ol-3,20-dione acetate.

Cpd. No.:
594. 19-chloro-9β,11β-oxido-Δ⁴-10α-pregnene-17α,21-diol-3,20-dione 21-acetate.
595. 19-chloro-9β,11β-oxido-16α-methyl-Δ⁴-10α-pregnene-17α,21-diol-3,20-dione 21-acetate.
596. 19-chloro-9β,11β-oxido-16β-methyl-Δ⁴-10α-pregnene-17α,21-diol-3,20-dione 21-acetate.
597. 19-fluoro-9β,11β-oxido-6β-methyl-Δ⁴-10α-pregnene-17α,21-diol-3,20-dione.
598. 19-fluoro-9β,11β-oxido-16α,17α-isopropylidenedioxy-6β-methyl-Δ⁴-10α-pregnen-21-ol-3,20-dione.
599. 19-fluoro-9β,11β-oxido-6β,16α-dimethyl-Δ⁴-10α-pregnene-17α,21-diol-3,20-dione.
600. 19-fluoro-9β,11β-oxido-6β,16β-dimethyl-Δ⁴-10α-pregnene-17α,21-diol-3,20-dione.
601. 19-chloro-9β,11β-oxido-16α,17α-isopropylidenedioxy-6β-methyl-Δ⁴-10α-pregnen-21-ol-3,20-dione.
602. 19-chloro-9β,11β-oxido-6β-methyl-Δ⁴-10α-pregnen-17α,21-diol-3,20-dione.
603. 19-chloro-9β,11β-oxido-6β,16α-dimethyl-Δ⁴-10α-pregnene-17α,21-diol-3,20-dione.
604. 19-chloro-9β,11β-oxido-6β,16β-dimethyl-Δ⁴-10α-pregnene-17α,21-diol-3,20-dione.
605. 19-fluoro-9β,11β-oxido-6α-methyl-Δ⁴-10α-pregnene-17α,21-diol-3,20-dione.
606. 19-fluoro-9β,11β-oxido-16α,17α-isopropylidenedioxy-6α-methyl-Δ⁴-10α-pregnen-21-ol-3,20-dione.
607. 19-fluoro-9β,11β-oxido-6α,16α-dimethyl-Δ⁴-10α-pregnene-17α,21-diol-3,20-dione.
608. 19-fluoro-9β,11β-oxido-6α,16β-dimethyl-Δ⁴-10α-pregnene-17α,21-diol-3,30-dione.
609. 19-chloro-9β,11β-oxido-16α,17α-isopropylidenedioxy-6α-methyl-Δ⁴-10α-pregnen-21-ol-3,20-dione.
610. 19-chloro-9β,11β-oxido-6α-methyl-Δ⁴-10α-pregnene-17α,21-diol-3,20-dione.
611. 19-chloro-9β,11β-oxido-6α,16α-dimethyl-Δ⁴-10α-pregnene-17α,21-diol-3,20-dione.
612. 19-chloro-9β,11β-oxido-6α,16β-dimethyl-Δ⁴-10α-pregnene-17α,21-diol-3,20-dione.
613. 6α-chloro-19-fluoro-9β,11β-oxido-Δ⁴-10α-pregnene-17α,21-diol-3,20-dione 21-acetate.
614. 6α-chloro-19-fluoro-9β,11β-oxido-16α,17α-isopropylidenedioxy-Δ⁴-10α-pregnen-21-ol-3,20-dione acetate.
615. 6α-chloro-19-fluoro-9β,11β-oxido-16α-methyl-Δ⁴-10α-pregnene-17α,21-diol-3,20-dione 21-acetate.
616. 6α-chloro-19-fluoro-9β,11β-oxido-16β-methyl-Δ⁴-10α-pregnene-17α,21-diol-3,20-dione 21-acetate.
617. 6α,19-dichloro-9β,11β-oxido-16α,17α-isopropylidenedioxy-Δ⁴-10α-pregnen-21-ol-3,20-dione acetate.
618. 6α,19-dichloro-9β,11β-oxido-Δ⁴-10αpregnene-17α,21-diol-3,20-dione 21-acetate.
619. 6α,19-dichloro-9β,11β-oxido-16α-methyl-Δ⁴-10α-pregnene-17α,21-diol-3,20-dione 21-acetate.
620. 6α,19-dichloro-9β,11β-oxido-16β-methyl-Δ⁴-10α-pregnene-17α,21-diol-3,20-dione 21-acetate.
621. 6α,19-difluoro-9β,11β-oxido-Δ⁴-10α-pregnene-17α,21-diol-3,20-dione 21-acetate.
622. 6α,19-difluoro-9β,11β-oxido-16α,17α-isopropylidenedioxy-Δ⁴-10α-pregnen-21-ol-3,20-dione acetate.
623. 6α,19-difluoro-9β,11β-oxido-16α-methyl-Δ⁴-10α-pregnene-17α,21-diol-3,20-dione 21-acetate.
624. 6α,19-difluoro-9β,11β-oxido-16β-methyl-Δ⁴-10α-pregnene-17α,21-diol-3,20-dione 21-acetate.
625. 6α-fluoro-19-chloro-9β,11β-oxido-16α,17α-isopropylidenedioxy-Δ⁴-10α-pregnen-21-ol-3,20-dione acetate.
626. 6α-fluoro-19-chloro-9β,11β-oxido-Δ⁴-10α-pregnene-17α,21-diol-3,20-dione 21-acetate.
627. 6α-fluoro-19-chloro-9β,11β-oxido-16α-methyl-Δ⁴-10α-pregnene-17α,21-diol-3,20-dione 21-acetate.
628. 6α-fluoro-19-chloro-9β,11β-oxido-16β-methyl-Δ⁴-10α-pregnene-17α,21-diol-3,20-dione 21-acetate.

Cpd. No.:
629. 6β-chloro-19-fluoro-9β,11β-oxido-Δ⁴-10α-pregnene-17α,21-diol-3,20-dione 21-acetate.
630. 6β-chloro-19-fluoro-9β,11β-oxido-16α,17α-isopropylidenedioxy-Δ⁴-10α-pregnen-21-ol-3,20-dione acetate.
631. 6β-chloro-19-fluoro-9β,11β-oxido-16α-methyl-Δ⁴-10α-pregnene-17α,21-diol-3,20-dione 21-acetate.
632. 6β-chloro-19-fluoro-9β,11β-oxido-16β-methyl-Δ⁴-10α-pregnene-17α,21-diol-3,20-dione 21-acetate.
633. 6β,19-dichloro-9β,11β-oxido-16α,17α-isopropylidenedioxy-Δ⁴-10α-pregnene-17α,21-diol-3,20-dione 21-acetate.
634. 6β,19-dichloro-9β,11β-oxido-Δ⁴-10α-pregnene-17α,21-diol-3,20-dione 21-acetate.
635. 6β,19-dichloro-9β,11β-oxido-16α-methyl-Δ⁴-10α-pregnene-17α,21-diol-3,20-dione 21-acetate.
636. 6β,19-dichloro-9β,11β-oxido-16β-methyl-Δ⁴-10α-pregnene-17α,21-diol-3,20-dione 21-acetate.
637. 6β,19-difluoro-9β,11β-oxido-Δ⁴-10α-pregnene-17α,21-diol-3,20-dione 21-acetate.
638. 6β,19-difluoro-9β,11β-oxido-16α,17α-isopropylidenedioxy-Δ⁴-10α-pregnene-21-ol-3,20-dione acetate.
639. 6β,19-difluoro-9β,11β-oxido-16α-methyl-Δ⁴-10α-pregnene-17α,21-diol-3,20-dione 21-acetate.
640. 6β,19-difluoro-9β,11β-oxido-16β-methyl-Δ⁴-10α-pregnene-17α,21-diol-3,20-dione 21-acetate.
641. 6β-fluoro-19-chloro-6β,11β-oxido-16α,17α-isopropylidenedioxy-Δ⁴-10α-pregnen-21-ol-3,20-dione acetate.
642. 6β-fluoro-19-chloro-9β,11β-oxido-Δ⁴-10α-pregnene-17α,21-diol-3,20-dione 21-acetate.
643. 6β-fluoro-19-chloro-9β,11β-oxido-16α-methyl-Δ⁴-10α-pregnene-17α,21-diol-3,20-dione 21-acetate.
644. 6β-fluoro-19-chloro-9β,11β-oxido-16β-methyl-Δ⁴-10α-pregnene-17α,21-diol-3,20-dione 21-acetate.

*Example LII*

In a polyethylene flask, adapted with magnetic stirrer, there was dissolved 1.8 g. of 19-fluoro-9β,11β-oxido-Δ⁴-10α-pregnene-17α,21-diol-3,20-dione 21-acetate (Cpd. No. 589). In 30 cc. of methylene chloride, the solution was cooled to 0° C. and a solution of 2.11 g. of anhydrous hydrogen fluoride in 3.7 cc. of tetrahydrofuran cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 9α,19-difluoro-Δ⁴-10α-pregnene-11β,17α,21-triol-3,20-dione 21-acetate (Cpd. No. 645).

When applying the above procedure to the compounds Nos. 590 to 644, inclusive, there were respectively obtained.

Cpd. No.:
646. 9α,19-difluoro-16α,17α-isopropylidenedioxy-Δ⁴-10α-pregnene-11β,21-diol-3,20-dione 21-acetate.

Cpd. No.:
647. 9α,19 - difluoro - 16α - methyl - Δ⁴ - 10α - pregnene - 11β,17α,21 - triol - 3,20 - dione 21 - acetate.
648. 9α,19 - difluoro - 16β - methyl - Δ⁴ - 10α - pregnene - 11β,17α,21 - triol - 3,20 - dione 21 - acetate.
649. 9α - fluoro - 19 - chloro - 16α,17α - isopropylidenedioxy - Δ⁴ - 10α - pregnene - 11β,21 - diol-3,20-dione 21-acetate.
650. 9α - fluoro - 19 - chloro - Δ⁴ - 10α - pregnene-11β,17α,21-triol-3,20-dione 21-acetate.
651. 9α - fluoro - 19 - chloro - 16α - methyl - Δ⁴-10α - pregnene - 11β,17α,21 - triol - 3,20 - dione 21-acetate.
652. 9α - fluoro - 19 - chloro - 16β - methyl - Δ⁴ - 10α-pregnene - 11β,17α,21 - triol - 3,20 - dione 21-acetate.
653. 9α,10 - difluoro - 6β - methyl - Δ⁴ - 10α - pregnene-11β,17α,21-triol-3,20-dione.
654. 9α,19 - difluoro - 16α,17α - isopropylidenedioxy-6β - methyl - Δ⁴ - 10α - pregnene - 11β,21 - diol-3,20-dione.
655. 9α,19 - difluoro - 6β,16α - dimethyl - Δ⁴ - 10α-pregnene-11β,17α,21-triol-3,20-dione.
656. 9α,19 - difluoro - 6β,16β - dimethyl - Δ⁴ - 10α-pregnene-11β,17α,21-triol-3,20-dione.
657. 9α - fluoro - 19 - chloro - 16α,17α - isopropylidenedioxy - 6β - methyl - Δ⁴ - 10α - pregnene-11β,21-diol-3,20-dione.
658. 9α - fluoro - 19 - chloro - 6β - methyl - Δ⁴ - 10α-pregnene-11β,17α,21-triol-3,20-dione.
659. 9α - fluoro - 19 - chloro - 6β,16α - dimethyl-Δ⁴ - 10α - pregnene - 11β,17α,21 - triol - 3,20-dione.
660. 9α - fluoro - 19 - chloro - 6β,16β - dimethyl-Δ⁴ - 10α - pregnene - 11β,17α,21 - triol - 3,20-dione.
661. 9α,19 - difluoro - 6α - methyl - Δ⁴ - 10α - pregnene-11β,17α,21-triol-3,20-dione.
662. 9α,19 - difluoro - 16α,17α - isopropylidenedioxy-6α - methyl - Δ⁴ - 10α - pregnene - 11β,21 - diol-3,20-dione.
663. 9α,19 - difluoro - 6α,16α - dimethyl - Δ⁴ - 10α-pregnene-11β,17α,21-triol-3,20-dione.
664. 9α,19 - difluoro - 6α,16β - dimethyl - Δ⁴ - 10α-pregnene-11β,17α,21-triol-3,20-dione.
665. 9α-fluoro-19-chloro-16α,17α-isopropylidenedioxy-6α-methyl-Δ⁴-10α-pregnene-11β,21-diol-3,20-dione.
666. 9α-fluoro-19-chloro-6α-methyl-Δ⁴-10α-pregnene-11β,17α,21-triol-3,20-dione.
667. 9α-fluoro-19-chloro-6α,16α-dimethyl-Δ⁴-10α-pregnene-11β,17α,21-triol-3,20-dione.
668. 9α-fluoro-19-chloro-6α,16β-dimethyl-Δ⁴-10α-pregnene-11β,17α,21-triol-3,20-dione.
669. 6α-chloro-9α,19-difluoro-Δ⁴-10α-pregnene-11β,17α,21-triol-3,20-dione 21-acetate.
670. 6α-chloro-9α,19-difluoro-16α,17α-isopropylidenedioxy-Δ⁴-10α-pregnene-11β,21-diol-3,20-dione 21-acetate.
671. 6α-chloro-9α,19-difluoro-16α-methyl-Δ⁴-10α-pregnene-11β,17α,21-triol-3,20-dione 21-acetate.
672. 6α-chloro-9α,19-difluoro-16β-methyl-Δ⁴-10α-pregnene-11β,17α,21-triol-3,20-dione 21-acetate.
673. 9α-fluoro-6α,19-dichloro-16α,17α-isopropylidenedioxy-Δ⁴-10α-pregnene-11β,21-diol-3,20-dione 21-acetate.
674. 9α-fluoro-6α,19-dichloro-Δ⁴-10α-pregnene-11β,17α,21-triol-3,20-dione 21-acetate.
675. 9α-fluoro-6α,19-dichloro-16α-methyl-Δ⁴-10α-pregnene-11β,17α,21-triol-3,20-dione 21-acetate.
676. 9α-fluoro-6α,19-dichloro-16β-methyl-Δ⁴-10α-pregnene-11β,17α,21-triol-3,20-dione 21-acetate.
677. 6α,9α,19-trifluoro-Δ⁴-10α-pregnene-11β,17α,21-triol-3,20-dione 21-acetate.

Cpd. No.:
678. 6α,9α,19-trifluoro-16α,17α-isopropylidenedioxy-Δ⁴-10α-pregnene-11β,21-diol-3,20-dione 21-acetate.
679. 6α,9α,19-trifluoro-16α-methyl-Δ⁴-10α-pregnene-11β,17α,21-triol-3,20-dione 21-acetate.
680. 6α,9α,19-trifluoro-16β-methyl-Δ⁴-10α-pregnene-11β,17α,21-triol-3,20-dione 21-acetate.
681. 6α,9α-difluoro-19-chloro-16α,17α-isopropylidenedioxy-Δ⁴-10α-pregnene-11β,21-diol-3,20-dione 21-acetate.
682. 6α,9α-difluoro-19-chloro-Δ⁴-10α-pregnene-11β,17α,21-triol-3,20-dione 21-acetate.
683. 6α,9α-difluoro-19-chloro-16α-methyl-Δ⁴-10α-pregnene-11β,17α,21-triol-3,20-dione 21-acetate.
684. 6α,9α-difluoro-19-chloro-16β-methyl-Δ⁴-10α-pregnene-11β,17α,21-triol-3,20-dione 21-acetate.
685. 6β-chloro-9α,19-difluoro-Δ⁴-10α-pregnene-11β,17α,21-triol-3,20-dione 21-acetate.
686. 6β-chloro-9α,19-difluoro-16α,17α-isopropylidenedioxy-Δ⁴-10α-pregnene-11β,21-diol-3,20-dione 21-acetate.
687. 6β-chloro-9α,19-difluoro-16α-methyl-Δ⁴-10α-pregnene-11β,17α,21-triol-3,20-dione 21-acetate.
688. 6β-chloro-9α,19-difluoro-16β-methyl-Δ⁴-10α-pregnene-11β,17α,21-triol-3,20-dione 21-acetate.
689. 9α-fluoro-6β,19-dichloro-16α,17α-isopropylidenedioxy-Δ⁴-10α-pregnene-11β,21-diol-3,20-dione 21-acetate.
690. 9α-fluoro-6β,19-dichloro-Δ⁴-10α-pregnene-11β,17α,21-triol-3,20-dione 21-acetate.
691. 9α-fluoro-6β,19-dichloro-16α-methyl-Δ⁴-10α-pregnene-11β,17α,21-triol-3,20-dione 21-acetate.
692. 9α-fluoro-6β,19-dichloro-16β-methyl-Δ⁴-10α-pregnene-11β,17α,21-triol-3,20-dione 21-acetate.
693. 6β,9α,19-trifluoro-Δ⁴-10α-pregnene-11β,17α,21-triol-3,20-dione 21-acetate.
694. 6β,9α,19-trifluoro-16α,17α-isopropylidenedioxy-Δ⁴-10α-pregnene-11β,21-diol-3,20-dione 21-acetate.
695. 6β,9α,19-trifluoro-16α-methyl-Δ⁴-10α-pregnene-11β,17α,21-triol-3,20-dione 21-acetate.
696. 6β,9α,19-trifluoro-16β-methyl-Δ⁴-10α-pregnene-11β,17α,21-triol-3,20-dione 21-acetate.
697. 6β,9α-difluoro-19-chloro-16α,17α-isopropylidenedioxy-Δ⁴-10α-pregnene-11β,21-diol-3,20-dione 21-acetate.
698. 6β,9α-difluoro-19-chloro-Δ⁴-10α-pregnene-11β,17α,21-triol-3,20-dione 21-acetate.
699. 6β,9α-difluoro-19-chloro-16α-methyl-Δ⁴-10α-pregnene-11β,17α,21-triol-3,20-dione 21-acetate.
700. 6β,9α-difluoro-19-chloro-16β-methyl-Δ⁴-10α-pregnene-11β,17α,21-triol-3,20-dione 21-acetate.

*Example LIII*

To a solution of 4 g. of 19-fluoro-9β,11β-oxido-Δ⁴-10α-pregnene-17α,21-diol - 3,20 - dione 21 - acetate (Cpd. No. 589), in 40 cc. of anhydrous chloroform, was added, over a period of 35 minutes, 30 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 9α-chloro-19-fluoro-Δ⁴-10α-pregnene-11β,17α,21-triol-3,20-dione 21-acetate (Cpd. No. 701).

The compounds Nos. 590 to 644, inclusive, were treated by the same procedure thus acording respectively:

Cpd. No.:
702. 9α-chloro-19-fluoro-16α,17α-isopropylidenedioxy-Δ⁴-10α-pregnene-11β,21-diol-3,20-dione 21-acetate.
703. 9α-chloro-19-fluoro-16α-methyl-Δ⁴-10α-pregnene-11β,17α,21-triol-3,20-dione 21-acetate.
704. 9α-chloro-19-fluoro-16β-methyl-Δ⁴-10α-pregnene-11β,17α,21-triol-3,20-dione 21-acetate.
705. 9α,19-dichloro-16α,17α-isopropylidenedioxy-Δ⁴-10α-pregnene-11β,21-diol-3,20-dione 21-acetate.
706. 9α,19-dichloro-Δ⁴-10α-pregnene-11β,17α,21-triol-3,20-dione 21-acetate.
707. 9α,19-dichloro-16α-methyl-Δ⁴-10α-pregnene-11β,17α,21-triol-3,20-dione 21-acetate.
708. 9α,19-dichloro-16β-methyl-Δ⁴-10α-pregnene-11β,17α,21-triol-3,20-dione 21-acetate.
709. 9α-chloro-19-fluoro-6β-methyl-Δ⁴-10α-pregnene-11β,17α,21-triol-3,20-dione.
710. 9α-chloro-19-fluoro-16α,17α-isopropylidenedioxy-6β-methyl-Δ⁴-10α-pregnene-11β,21-diol-3,20-dione.
711. 9α-chloro-19-fluoro-6β,16α-dimethyl-Δ⁴-10α-pregnene-11β,17α,21-triol-3,20-dione.
712. 9α-chloro-19-fluoro-6β,16β-dimethyl-Δ⁴-10α-pregnene-11β,17α,21-triol-3,20-dione.
713. 9α,-19-dichloro-16α,17α-isopropylidenedioxy-6β-methyl-Δ⁴-10α-pregnene-11β,21-diol-3,20-dione.
714. 9α,19-dichloro-6β-methyl-Δ⁴-10α-pregnene-11β,17α,21-triol-3,20-dione.
715. 9α,19-dichloro-6β,16α-dimethyl-Δ⁴-10α-pregnene-11β,17α,21-triol-3,20-dione.
716. 9α,19-dichloro-6β,16β-dimethyl-Δ⁴-10α-pregnene-11β,17α,21-triol-3,20-dione.
717. 9α-chloro-19-fluoro-6α-methyl-Δ⁴-10α-pregnene-11β,17α,21-triol-3,20-dione.
718. 9α-chloro-19-fluoro-16α,17α-isopropylidenedioxy-6α-methyl-Δ⁴-10α-pregnene-11β,21-diol-3,20-dione.
719. 9α-chloro-19-fluoro-6α,16α-dimethyl-Δ⁴-10α-pregnene-11β,17α,21-triol-3,20-dione.
720. 9α-chloro-19-fluoro-6α,16β-dimethyl-Δ⁴-10α-pregnene-11β,17α,21-triol-3,20-dione.
721. 9α,19-dichloro-16α,17α-isopropylidenedioxy-6α-methyl-Δ⁴-10α-pregnene-11β,21-diol-3,20-dione.
722. 9α,19-dichloro-6α-methyl-Δ⁴-10α-pregnene-11β,17α,21-triol-3,20-dione.
723. 9α,19-dichloro-6α,16α-dimethyl-Δ⁴-10α-pregnene-11β,17α,21-triol-3,20-dione.
724. 9α,19-dichloro-6α,16β-dimethyl-Δ⁴-10α-pregnene-11β,17α,21-triol-3,20-dione.
725. 6α,9α-dichloro-19-fluoro-Δ⁴-10α-pregnene-11β,17α,21-triol-3,20-dione 21-acetate.
726. 6α,9α-dichloro-19-fluoro-16α,17α-isopropylidenedioxy-Δ⁴-10α-pregnene-11β,21-diol-3,20-dione 21-acetate.
727. 6α,9α-dichloro-19-fluoro-16α-methyl-Δ⁴-10α-pregnene-11β,17α,21-triol-3,20-dione 21-acetate.
728. 6α,9α-dichloro-19-fluoro-16β-methyl-Δ⁴-10α-pregnene-11β,17α,21-triol-3,20-dione 21-acetate.
729. 6α,9α,19-trichloro-16α,17α-isopropylidenedioxy-Δ⁴-10α-pregnene-11β,21-diol-3,20-dione 21-acetate.
730. 6α,9α,19-trichloro-Δ⁴-10α-pregnene-11β,17α,21-triol-3,20-dione 21-acetate.
731. 6α,9α,19-trichloro-16α-methyl-Δ⁴-10α-pregnene-11β,17α,21-triol-3,20-dione 21-acetate.
732. 6α,9α,19-trichloro-16β-methyl-Δ⁴-10α-pregnene-11β,17α,21-triol-3,20-dione 21-acetate.
733. 9α-chloro-6α,19-difluoro-Δ⁴-10α-pregnene-11β,17α,21-triol-3,20-dione 21-acetate.
734. 9α-chloro-6α,19-difluoro-16α,17α-isopropylidenedioxy-Δ⁴-10α-pregnene-11β,21-diol-3,20-dione 21-acetate.
735. 9α-chloro-6α,19-difluoro-16α-methyl-Δ⁴-10α-pregnene-11β,17α,21-triol-3,20-dione 21-acetate.
736. 9α-chloro-6α,19-difluoro-16β-methyl-Δ⁴-10α-pregnene-11β,17α,21-triol-3,20-dione 21-acetate.
737. 6α-fluoro-9α,19-dichloro-16α,17α-isopropylidenedioxy-Δ⁴-10α-pregnene-11β,21-diol 3,20-dione 21-acetate.
738. 6α-fluoro-9α,19-dichloro-Δ⁴-10α-pregnene-11β,17α,21-triol-3,20-dione 21-acetate.
739. 6α-fluoro-9α,19-dichloro-16α-methyl-Δ⁴-10α-pregnene-11β,17α,21-triol-3,20-dione 21-acetate.
740. 6α-fluoro-9α,19-dichloro-16β-methyl-Δ⁴-10α-pregnene-11β,17α,21-triol-3,20-dione 21-acetate.
741. 6β,9α-dichloro-19-fluoro-Δ⁴-10α-pregnene-11β,17α,21-triol-3,20-dione 21-acetate.
742. 6β,9α-dichloro-19-fluoro-16α,17α-isopropylidenedioxy-Δ⁴-10α-pregnene-11β,21-diole-3,20-dione 21-acetate.
743. 6β,9α-dichloro-19-fluoro-16α-methyl-Δ⁴-10α-pregnene-11β,17α,21-triol-3,20-dione 21-acetate.
744. 6β,9α-dichloro-19-fluoro-16β-methyl-Δ⁴-10α-pregnene-11β,17α,21-triol-3,20-dione 21-acetate.
745. 6β,9α,19-trichloro-16α,17α-isopropylidenedioxy-Δ⁴-10α-pregnene-11β,21-diol-3,20-dione 21-acetate.
746. 6β,9α,19-trichloro-Δ⁴-10α-pregnene-11β,17α,21-triol-3,20-dione 21-acetate.
747. 6β,9α,19-trichloro-16α-methyl-Δ⁴-10α-pregnene-11β,17α,21-triol-3,20-dione 21-acetate.
748. 6β,9α,19-trichloro-16β-methyl-Δ⁴-10α-pregnene-11β,17α,21-triol-3,20-dione 21-acetate.
749. 9α-chloro-6β,19-difluoro-Δ⁴-10α-pregnene-11β,17α,21-triol-3,20-dione 21-acetate.
750. 9α-chloro-6β,19-difluoro-16α,17α-isopropylidenedioxy-Δ⁴-10α-pregnene-11β,21-diole-3,20-dione 21-acetate.
751. 9α-chloro-6β,19-difluoro-16α-methyl-Δ⁴-10α-pregnene-11β,17α,21-triol-3,20-dione 21-acetate.
752. 9α-chloro-6β,19-difluoro-16β-methyl-Δ⁴-10α-pregnene-11β,17α,21-triol-3,20-dione 21-acetate.
753. 6β-fluoro-9α,19-dichloro-16α,17α-isopropylidenedioxy-Δ⁴-10α-pregnene-11β,21-diol-3,20-dione 21-acetate.
754. 6β-fluoro-9α,19-dichloro-Δ⁴-10α-pregnene-11β,17α,21-triol-3,20-dione 21-acetate.
755. 6β-fluoro-9α,19-dichloro-16α-methyl-Δ⁴-10α-pregnene-11β,17α,21-triol-3,20-dione 21-acetate.
756. 6β-fluoro-9α,19-dichloro-16β-methyl-Δ⁴-10α-pregnene-11β,17α,21-triol-3,20-dione 21-acetate.

*Example LIV*

A solution of 1 g. of 19-fluoro-Δ⁴-10α-pregnene-11β,17α,21-triol-3,20-dione 21-acetate (Cpd. No. 533) in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 19 - fluoro-Δ⁴-10α - pregnene - 17α,21-diol - 3,11,20-trione 21-acetate (Cpd. No. 757).

The compounds Nos. 534 to 540, inclusive, were treated by the above procedure, thus affording respectively:

Cpd. No.:
758. 19-fluoro-16α,17α-isopropylidenedioxy-Δ⁴-10α-pregnen-21-ol-3,11,20-trione acetate.
759. 19-fluoro-16α-methyl-Δ⁴-10α-pregnene-17α,21-diol-3,11,20-trione 21-acetate.
760. 19-fluoro-16β-methyl-Δ⁴-10α-pregnene-17α,21-diol-3,11,20-trione 21-acetate.
761. 19-chloro-16α,17α-isopropylidenedioxy-Δ⁴-10α-pregnen-21-ol-3,11,20-trione acetate.
762. 19-chloro-Δ⁴-10α-pregnene-17α,21-diol-3,11,20-trione 21-acetate.
763. 19-chloro-16α-methyl-Δ⁴-10α-pregnene-17α,21-diol-3,11,20-trione 21-acetate.
764. 19-chloro-16β-methyl-Δ⁴-10α-pregnene-17α,21-diol-3,11,20-trione 21-acetate.

*Example LV*

The compounds Nos. 557 to 588, inclusive, were treated following the procedure described in Example XVII, thus affording the corresponding 3,11,20-trione derivatives.

*Example LVI*

The compounds Nos. 645 to 652, inclusive, Nos. 669 to 708 inclusive, and Nos. 725 to 756, inclusive were treated in accordance with Example LIV, thus yielding the corresponding 3,11,20-trione derivatives.

*Example LVII*

A mixture of 1 g. of 19-fluoro-Δ⁴-10α-pregnene-11β,17α,21-triol-3,20-dione 21-acetate (Cpd. No. 533), 2 g. of chloranil and 50 cc. of terbutanol was refluxed for 8 hours. The mixture was cooled, the excess of chloranil filtered off and washed with ethyl acetate and the organic extracts washed with a cold aqueous solution of 10% sodium hydroxide until the washings were colorless. It was then dried over anhydrous sodium sulfate and evaporated to dryness. Recrystallization from methylene chloride-ether, after decolorization with 2 g. of alumina, gave 19-fluoro-Δ⁴,⁶-10α-pregnadiene-11β,17α,21-triol-3,20-dione 21-acetate (Cpd. No. 765).

Following the same procedure, there were treated the compounds Nos. 534 to 540, inclusive, affording respectively:

Cpd. No.:
766. 19-fluoro-16α,17α-isopropylidenedioxy-Δ⁴,⁶-10α-pregnadiene-11β,21-diol-3,20-dione 21-acetate.
767. 19-fluoro-16α-methyl-Δ⁴,⁶-10α-pregnadiene-11β,17α,21-triol-3,20-dione 21-acetate.
768. 19-fluoro-16β-methyl-Δ⁴,⁶-10α-pregnadiene-11β,17α,21-triol-3,20-dione 21-acetate.
769. 19-chloro-16α,17α-isopropylidenedioxy-Δ⁴,⁶-10α-pregnadiene-11β,21-diol-3,20-dione 21-acetate.
770. 19-chloro-Δ⁴,⁶-10α-pregnadiene-11β,17α,21-triol-3,20-dione 21-acetate.
771. 19-chloro-16α-methyl-Δ⁴,⁶-10α-pregnadiene-11β,17α,21-triol-3,20-dione 21-acetate.
772. 19-chloro-16β-methyl-Δ⁴,⁶-10α-pregnadiene-11β,17α,21-triol-3,20-dione 21-acetate.

*Example LVIII*

The compounds Nos. 757 to 764, inclusive, were treated in accordance with the foregoing example, thus affording respectively.

Cpd. No.:
773. 19-fluoro-Δ⁴,⁶-10α-pregnadiene-17α,21-diol-3,11,20-trione 21-acetate.
774. 19-fluoro-16α,17α-isopropylidenedioxy-Δ⁴,⁶-10α-pregnadien-21-ol-3,11,20-trione acetate.
775. 19-fluoro-16α-methyl-Δ⁴,⁶-10α-pregnadiene-17α,21-diol-3,11,20-trione 21 acetate.
776. 19-fluoro-16β-methyl-Δ⁴,⁶-10α-pregnadiene-17α,21-diol-3,11,20-trione 21-acetate.
777. 19-chloro-16α,17α-isopropylidenedioxy-Δ⁴,⁶-10α-pregnadien-21-ol-3,11,20-trione acetate.
778. 19-chloro-Δ⁴,⁶-10α-pregnadiene-17α,21-diol-3,11,20-trione 21-acetate.
779. 19-chloro-16α-methyl-Δ⁴,⁶-10α-pregnadiene-17α,21-diol-3,11,20-trione 21-acetate.
780. 19-chloro-16β-methyl-Δ⁴,⁶-10α-pregnadiene-17α,21-diol-3,11,20-trione 21-acetate.

*Example LIX*

The compounds Nos. 541 to 588, inclusive, and Nos. 645 to 756, inclusive, were treated following the procedure described in Example LVII, thus affording the corresponding Δ⁴,⁶-derivatives.

*Example LX*

A mixture of 500 mg. of 19-fluoro-Δ⁴-10α-pregnene-11β,17α,21-triol-3,20-dione 21-acetate (Cpd. No. 533), 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 19-fluoro-Δ¹,⁴-10α-pregnadiene-11β,17α,21-triol-3,20-dione 21-acetate. (Cpd. No. 781).

Following the same procedure, there were treated the compounds Nos. 534 to 540, inclusive, affording respectively.

Cpd. No.:
782. 19-fluoro-16α,17α-isopropylidenedioxy-Δ¹,⁴-10α-pregnadiene-11β,21-diol-3,20-dione 21-acetate.
783. 19-fluoro-16α-methyl-Δ¹,⁴-10α-pregnadiene-11β,17α,21-triol-3,20-dione 21-acetate.
784. 19-fluoro-16β-methyl-Δ¹,⁴-10α-pregnadiene-11β,17α,21-triol-3,20-dione 21-acetate.
785. 19-chloro-16α,17α-isopropylidenedioxy-Δ¹,⁴-10α-pegnadiene-11β,21-diol-3,20-dione 21-acetate.
786. 19-chloro-Δ¹,⁴-10α-pregnadiene-11β,17α,21-triol-3,20-dione 21-acetate.
787. 19-chloro-16α-methyl-Δ¹,⁴-10α-pregnadiene-11β,17α,21-triol-3,20-dione 21-acetate.
788. 19-chloro-16β-methyl-Δ¹,⁴-10α-pregnadiene-11β,17α,21-triol-3,20-dione 21-acetate.

*Example LXI*

The compounds Nos. 757 to 764, inclusive, were treated in accordance with the foregoing example, thus affording respectively.

Cpd. No.:
789. 19-fluoro-Δ¹,⁴-10α-pregnadiene-17α,21-diol-3,11,20-trione 21-acetate.
790. 19-fluoro-16α,17α-isopropylidenedioxy-Δ¹,⁴-10α-pregnadien-21-ol-3,11,20-trione acetate.
791. 19-fluoro-16α-methyl-Δ¹,⁴-10α-pregnadiene-17α,21-diol-3,11,20-trione 21-acetate.
792. 19-fluoro-16β-methyl-Δ¹,⁴-10α-pregnadiene-17α,21-diol-3,11,20-trione 21-acetate.
793. 19-chloro-16α,17α-isopropylidenedioxy-Δ¹,⁴-10α-pregnadien-21-ol-3,11,20-trione acetate.
794. 19-chloro-Δ¹,⁴-10α-pregnadiene-17α,21-diol-3,11,20-trione 21-acetate.
795. 19-chloro-16α-methyl-Δ¹,⁴-10α-pregnadiene-17α,21-diol-3,11,20-trione 21-acetate.
796. 19-chloro-16β-methyl-Δ¹,⁴-10α-pregnadiene-17α,21-diol-3,11,20-trione 21-acetate.

Example LXII

The compounds Nos. 541 to 588, inclusive, and Nos. 645 to 656, inclusive, were treated following the procedure described in Example LX, thus affording the corresponding $\Delta^{1,4}$-derivatives.

Example LXIII

The compounds Nos. 765 to 780, inclusive, were treated in accordance with Example LX, thus furnishing respectively.

Cpd. No.:
- 797. 19-fluoro-$\Delta^{1,4,6}$-10α-pregnatriene-11β,17α,21-triol-3,20-dione 21-acetate.
- 798. 19-fluoro-16α,17α-isopropylidenedioxy-$\Delta^{1,4,6}$-10α-pregnatriene-11β,21-diol-3,20-dione 21-acetate.
- 799. 19-fluoro-16α-methyl-$\Delta^{1,4,6}$-10α-pregnatriene-11β,17α,21-triol-3,20-dione 21-acetate.
- 800. 19-fluoro-16β-methyl-$\Delta^{1,4,6}$-10α-pregnatriene-11β,17α,21-triol-3,20-dione 21-acetate.
- 801. 19-chloro-16α,17α-isopropylidenedioxy-$\Delta^{1,4,6}$-10α-pregnatriene-11β,21-diol-3,20-dione 21-acetate.
- 802. 19-chloro-$\Delta^{1,4,6}$-10α-pregnatriene-11β,17α,21-triol-3,20-dione 21-acetate.
- 803. 19-chloro-16α-methyl-$\Delta^{1,4,6}$-10α-pregnatriene-11β,17α,21-triol-3,20-dione 21-acetate.
- 804. 19-chloro-16β-methyl-$\Delta^{1,4,6}$-10α-pregnatriene-11β,17α,21-triol-3,20-dione 21-acetate.
- 805. 19-fluoro-$\Delta^{1,4,6}$-10α-pregnatriene-17α,21-diol-3,11,20-trione 21-acetate.
- 806. 19-fluoro-16α,17α-isopropylidenedioxy-$\Delta^{1,4,6}$-10αpregnatriene-21-ol-3,11,20-trione acetate.
- 807. 19-fluoro-16α-methyl-$\Delta^{1,4,6}$-10α-pregnatriene-17α,21-diol-3,11,20-trione 21-acetate.
- 808. 19-fluoro-16β-methyl-$\Delta^{1,4,6}$-10α-pregnatriene-17α,21-diol-3,11,20-trione 21-acetate.
- 809. 19-chloro-16α,17α-isopropylidenedioxy-$\Delta^{1,4,6}$-10α-pregnatriene-21-ol-3,11,20-trione acetate.
- 810. 19-chloro-$\Delta^{1,4,6}$-10α-pregnatriene-17α,21-diol-3,11,20-trione 21-acetate.
- 811. 19-chloro-16α-methyl-$\Delta^{1,4,6}$-10α-pregnatriene-17α,21-diol-3,11,20-trione 21-acetate.
- 812. 19-chloro-16β-methyl-$\Delta^{1,4,6}$-10α-pregnatriene-17α,21-diol-3,11,20-trione 21-acetate.

Example LXIV

The final compounds of Example LIX were treated in accordance with Example LX, thus affording the corresponding $\Delta^{1,4,6}$-derivatives.

Example LXV 2 g. of 19-fluoro-$\Delta^4$-10α-pregnene-11β,17α,21-triol-3,20-dione 21-acetate (Cpd. No. 533), was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 19-fluoro-$\Delta^4$-10α-pregnene-11β,17α,21-triol-3,20-dione (Cpd. No. 813).

Following the same procedure, there were treated compounds Nos. 534 to 540 inclusive, thus yielding respectively.

Cpd. No.:
- 814. 19-fluoro-16α,17α-isopropylidenedioxy-$\Delta^4$-10α-pregnene-11β,21-diol-3,20-dione.
- 815. 19-fluoro-16α-methyl-$\Delta^4$-10α-pregnene-11β,17α,21-triol-3,20-dione.

Cpd. No.:
- 816. 19-fluoro-16β-methyl-$\Delta^4$-10α-pregnene-11β,17α,21-triol-3,20-dione.
- 817. 19-chloro-16α,17α-isopropylidenedioxy-$\Delta^4$-10α-pregnene-11β,21-diol-3,20-dione.
- 818. 19-chloro-$\Delta^4$-10α-pregnene-11β,17α,21-triol-3,20-dione.
- 819. 19-chloro-16α-methyl-$\Delta^4$-10α-pregnene-11β,17α,21-triol-3,20-dione.
- 820. 19-chloro-16β-methyl-$\Delta^4$-10α-pregnene-11β,17α,21-triol-3,20-dione.

Example LXVI

The compounds Nos. 757 to 764, inclusive, were treated following the procedure of Example LXV, thus affording respectively.

Cpd. No.:
- 821. 19-fluoro-$\Delta^4$-10α-pregnene-17α,21-diol-3,11,20-trione.
- 822. 19-fluoro-16α,17α-isopropylidenedioxy-$\Delta^4$-10α-pregnen-21-ol-3,11,20-trione.
- 823. 19-fluoro-16α-methyl-$\Delta^4$-10α-pregnene-17α,21-diol-3,11,20-trione.
- 824. 19-fluoro-16β-methyl-$\Delta^4$-10α-pregnene-17α,21-diol-3,11,20-trione.
- 825. 19-chloro-16α,17α-isopropylidenedioxy-$\Delta^4$-10α-pregnen-21-ol-3,11,20-trione.
- 826. 19-chloro-$\Delta^4$-10α-pregnene-17α,21-diol-3,11,20-trione.
- 827. 19-chloro-16α-methyl-$\Delta^4$-10α-pregnene-17α,21-diol-3,11,20-trione.
- 828. 19-chloro-16β-methyl-$\Delta^4$-10α-pregnene-17α,21-diol-3,11,20-trione.

Example LXVII

The compounds Nos. 557 to 588, inclusive, Nos. 645 to 652, inclusive, Nos. 669 to 708, inclusive, and Nos. 725 to 756, inclusive, were treated in accordance with Example LXV, thus producing the corresponding 21-free alcohols.

Example XVIII

The compounds Nos. 766 to 812, inclusive, were treated following the procedure described in Example LXVI, thus wielding respectively:

Cpd. No.:
- 829. 19-fluoro-16α,-17α-isopropylidenedioxy-$\Delta^{4,6}$-10α-pregnadiene-11β,21-diol-3,20-dione.
- 830. 19-fluoro-16α-methyl-$\Delta^{4,6}$-10α-pregnadiene-11β,17α,21-triol-3,20-dione.
- 831. 19-fluoro-16β-methyl-$\Delta^{4,6}$-10α-pregnadiene-11β,17α,21-triol-3-20-dione.
- 832. 19-chloro-16α,17α-isopropylidenedioxy-$\Delta^{4,6}$-10α-pregnadiene-11β,21-diol-3,20-dione.
- 833. 19-chloro-$\Delta^{4,6}$-10α-pregnadiene-11β,17α,21-triol-3,20-dione.
- 834. 19-chloro-16α-methyl-$\Delta^{4,6}$-10α-pregnadiene-11β,17α,21-triol-3,20-dione.
- 835. 19-chloro-16β-methyl-$\Delta^{4,6}$-10α-pregnadiene-11β,17α,21-triol-3,20-dione.
- 836. 19-fluoro-$\Delta^{4,6}$-10α-pregnadiene-17α,21-diol-3,11,20-trione.
- 837. 19-fluoro-16α-17α-isopropylidenedioxy-$\Delta^{4,6}$-10α-pregnadiene-21,ol-3,11,20-trione.
- 838. 19-fluoro-16α-methyl$\Delta^{4,6}$-10α-pregnadiene-17α,21-diol-3,11,20-trione.
- 839. 19-fluoro-16β-methyl-$\Delta^{4,6}$-10α-pregnadiene-17α,21-diol-3,11,20-trione.
- 840. 19-chloro-16α,17α-isopropylidenedioxy-$\Delta^{4,6}$-10α-pregnadiene-21-ol-3,11,20-trione.
- 841. 19-chloro-$\Delta^{4,6}$-10α-pregnadiene-17α,21-diol-3,11,20-trione.
- 842. 19-chloro-16α-methyl-$\Delta^{4,6}$-10α-pregnadiene-17α,21-diol-3,11,20-trione.

Cpd. No.:
843. 19-chloro-16β-methyl-Δ$^{4,6}$-10α-pregnadiene-17α,21-diol-3,11,20-trione.
844. 19-fluoro-Δ$^{1,4}$-10α-pregnadiene-11β,17α,21-triol-3,20-dione.
845. 19-fluoro-16α,17α-isopropylidenedioxy-Δ$^{1,4}$-10α-pregnadiene-11β,21-diol-3,20-dione.
846. 19-fluoro-16α-methyl-Δ$^{1,4}$-10α-pregnadiene-11β,17α,21-triol-3,20-dione.
847. 19-fluoro-16β-methyl-Δ$^{1,4}$-10α-pregnadiene-11β,17α-21-triol-3,20-dione.
848. 19-chloro-16α,17α-isopropylidenedioxy-Δ$^{1,4}$-10α-pregnadiene-11β,21-diol-3,20-dione.
849. 19-chloro-Δ$^{1,4}$-10α-pregnadiene-11β,17α,21-triol-3,20-dione.
850. 19-chloro-16α-methyl-Δ$^{1,4}$-10α-pregnadiene-11β,17α,21-triol-3,20-dione.
851. 19-chloro-16β-methyl-Δ$^{1,4}$-10α-pregnadiene-11β,17α,21-triol-3,20-dione.
852. 19-fluoro-Δ$^{1,4}$-10α-pregnadiene-17α,21-diol-3,11,20-trione.
853. 19-fluoro-16α,17α-isopropylidenedioxy-Δ$^{1,4}$-10α-pregnadiene-21-ol-3,11,20-trione.
854. 19-fluoro-16α-methyl-Δ$^{1,4}$-10α-pregnadiene-17α,21-diol-3,11,20-trione.
855. 19-fluoro-16β-methyl-Δ$^{1,4}$-10α-pregnadiene-17α,21-diol-3,11,20-trione.
856. 19-chloro-16α,17α-isopropylidenedioxy-Δ$^{1,4}$-10α-pregnadiene-21-ol-3,11,20-trione.
857. 19-chloro-Δ$^{1,4}$-10α-pregnadiene-17α,21-diol-2,11,20-trione.
858. 19-chloro-16α-methyl-Δ$^{1,4}$-10α-pregnadiene-17α,21-diol-3,11,20-trione.
859. 19-chloro-16β-methyl-Δ$^{1,4}$-10α-pregnadiene-17α,21-diol-3,11,20-trione.
860. 19-fluoro-Δ$^{1,4,6}$-10α-pregnadiene-11β,17α,21-triol-3,20-dione.
861. 19-fluoro-16α,17α-isopropylidenedioxy-Δ$^{1,4,6}$-10α-pregnatriene-11β,21-diol-3,20-dione.
862. 19-fluoro-16α-methyl-Δ$^{1,4,6}$-10α-pregnatriene-11β,17α,21-triol-3,20-dione.
863. 19-fluoro-16β-methyl-Δ$^{1,4,6}$-10α-pregnatriene-11β,17α,21-triol-3,20-dione.
864. 19-chloro-16α,17α-isopropylidenedioxy-Δ$^{1,4,6}$-10α-pregnatriene-11β,21-diol-3,20-dione.
865. 19-chloro-Δ$^{1,4,6}$-10α-pregnatriene-11β,17α,21-triol-3,20-dione.
866. 19-chloro-16α-methyl-Δ$^{1,4,6}$-10α-pregnatriene-11β,17α,21-triol-3,20-dione.
867. 19-chloro-16β-methyl-Δ$^{1,4,6}$-10α-pregnatriene-11β,17α,21-triol-3,20-dione.
868. 19-fluoro-Δ$^{1,4,6}$-10α-pregnatriene-17α,21-diol-3,11,20-trione.
869. 19-fluoro-16α,17α-isopropylidenedioxy-Δ$^{1,4,6}$-10α-pregnatriene-21-ol-3,11,20-trione.
870. 19-fluoro-16α-methyl-Δ$^{1,4,6}$-10α-pregnatriene-17α,21-diol-3,11,20-trione.
871. 19-fluoro-16β-methyl-Δ$^{1,4,6}$-10α-pregnatriene-17α,21-diol-3,11,20-trione.
872. 19-chloro-16α,17α-isopropylidenedioxy-Δ$^{1,4,6}$-10α-pregnatriene-21-ol-3,11,20-trione.
873. 19-chloro-Δ$^{1,4,6}$-10α-pregnadiene-17α,21-diol-3,11,20-trione.
874. 19-chloro-16α-methyl-Δ$^{1,4,6}$-10α-pregnatriene-17α,21-diol-3,11,20-trione.
875. 19-chloro-16β-methyl-Δ$^{1,4,6}$-10α-pregnatriene-17α,21-diol-3,11,20-trione.

*Example LXIX*

A mixture of 1 g. of 19-fluoro-6β-methyl-Δ$^4$-10α-pregnene-11β,17α,21-triol-3,20-dione (Cpd. No. 541) 4 cc. of pyridine and 2 cc. of acetic anhydride was kept at room temperature overnight, poured into ice water, the formed precipitate was filtered, washed with water and dried. Crystallization from acetone-hexane gave the 21-acetate of 19-fluoro-6β-methyl-Δ$^4$-10α-pregnene-11β,17α,21-triol-3,20-dione (Cpd. No. 876).

The compounds Nos. 542 to 556, inclusive, were treated by the same procedure, thus yielding the corresponding 21-acetates.

*Example LXX*

Upon treatment of compounds Nos. 543 to 556 inclusive, by the procedure described in Example LXIX except that acetic anhydride was substituted by propionic anhydride and caproic anhydride, there were respectively produced the corresponding 21-proponiates and 21-caproates.

*Example LXXI*

1 g. of 19-fluoro-16α,17α-isopropylidenedioxy-Δ$^4$-10α-pregnene-11β,21-diol-3,20-dione 21-acetate (Cpd. No. 534), was heated on the steam bath with 20 cc. of 60% formic acid for 1 hour, cooled, diluted with water and the precipitate was collected, washed with water, dried, and recrystallized from acetone-hexane, thus affording 19-fluoro-Δ$^4$-10αpregnene-11β,16α,17α,21 - tetrol - 3,20-dione 21-acetate (Cpd. No. 877).

Following the same procedure, there were treated the compounds Nos. 537, 550, 553, 558, 561, 566 and 569, thus affording respectively.

Cpd. No.:
878. 19-chloro-Δ$^4$-10α - pregnene - 11β,16α,17α,21-tetrol-3,20-dione 21-acetate.
879. 19-fluoro-6α-methyl-Δ$^4$-10α-pregnene - 11β,16α,17α,21-tetrol-3,20-dione.
880. 19-chloro-6α-methyl-Δ$^4$-10α-pregnene - 11β,16α,17α,21-tetrol-3,20-dione.
881. 6α-chloro-19-fluoro-Δ$^4$-10α-pregnene - 11β,16α,17α,21-tetrol-3,20-dione 21-acetate.
882. 6α,19-dichloro-Δ$^4$-10α-pregnene - 11β,16α,17α,21-tetrol-3,20-dione 21-acetate.
883. 6α,19-difluoro-Δ$^4$-10α-pregnene-11β,16α,17α,21-tetrol-3,20-dione 21-acetate.
884. 6α-fluoro-19-chloro-Δ$^4$-10α-pregnene - 11β,16α,17α,21-tetrol-3,20-dione 21-acetate.

*Example LXXII*

The compounds Nos. 646, 649, 662, 665, 670 and 673, were treated following the procedure described in Example LXXI, thus affording respectively.

Cpd. No.:
885. 9α,19-difluoro-Δ$^4$-10α - pregnene - 11β,16α,17α,21-tetrol-3,20-dione 21-acetate.
886. 9α-fluoro-19-chloro-Δ$^4$-10α-pregnene - 11β,16α,17α,21-tetrol-3,20-dione 21-acetate.
887. 9α,19 - difluoro - 6α-methyl-Δ$^4$-10α-pregnene-11β,16α,17α,21-tetrol-3,20-dione.
888. 9α-fluoro-19-chloro-6α - methyl - Δ$^4$-10α-pregnene-11β,16α,17α,21-tetrol-3,20-dione.
889. 6α-chloro-9α,19 - difluoro - Δ$^4$ - 10α-pregnene-11β,16α,17α,21-tetrol-3,20-dione 21-acetate.
890. 9α-fluoro-6α,19 - dichloro - Δ$^4$ - 10α-pregnene-11β,16α,17α,21-tetrol-3,20-dione 21-acetate.

*Example LXXIII*

The compounds Nos. 877, 878, 881, 882, 883 and 884, were treated following the procedure of Example LXV, thus affording respectively.

Cpd. No.:
891. 19-fluoro-Δ$^4$ - 10α - pregnene - 11β,16α,17α,21-tetrol-3,20-dione.
892. 19-chloro-Δ$^4$ - 10α - pregnene - 11β,16α,17α,21-tetrol-3,20-dione.
893. 6α-chloro-19-fluoro-Δ$^4$-10α-pregnene - 11β,16α,17α,21-tetrol-3,20-dione.
894. 6α,19-dichloro-Δ$^4$-10α-pregnene - 11β,16α,17α,21-tetrol-3,20-dione.

Cpd. No.:
  895. 6α,19-difluoro-Δ⁴-10α-pregnene-11β,16α,17α,21-tetrol-3,20-dione.
  896. 6α-fluoro-19-chloro-Δ⁴-10α-pregnene - 11β,16α,17α-21-tetrol-3,20-dione.

Example LXXIV

The compounds Nos. 877 to 884, inclusive, were treated by the method of Example LXIX, thus affording respectively.

Cpd. No.:
  897. 19-fluoro - Δ⁴-10α - pregnene - 11β,16α,17α,21-tetrol 3,20-dione 16,21-diacetate.
  898. 19-chloro-Δ⁴ - 10α - pregnene - 11β,16α,17α,21-tetrol-3,20-dione 16,21-diacetate.
  899. 19-fluoro-6α-methyl-Δ⁴-10α-pregnene - 11β,16α,17α,21-tetrol-3,20-dione 16,21-diacetate.
  900. 19-chloro-6α-methyl-Δ⁴ - 10α - pregnene - 11β,16α,17α,21-tetrol-3,20-dione 16,21-diacetate.
  901. 6α-chloro-19-fluoro-Δ⁴-10α-pregnene - 11β,16α,17α,21-tetrol-3,20-dione 16,21-diacetate.
  902. 6α,19-dichloro-Δ⁴-10α-pregnene - 11β,16α,17α,21-tetrol-3,20-dione 16,21-diacetate.
  903. 6α,19-difluoro-Δ⁴-10α - pregnene - 11β,16α,17α,21-tetrol-3,20-dione 16,21-diacetate.
  904. 6α-fluoro-19-chloro-Δ⁴-10α-pregnene - 11β,16α,17α-21-tetrol-3,20-dione 16,21-diacetate.

Example LXXV

A mixture of 1 g. of 19-fluoro-Δ⁴-10α-pregnene-11β,16α,17α,21-tetrol-3,20-dione 21-acetate (Cpd. No. 877), 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded 19-fluoro-Δ⁴-10α-pregnene-11β,16α,17α,21-tetrol-3,20-dione 21 - acetate 16,17-acetophenonide (Cpd. No. 905).

The compounds Nos. 878 to 890, inclusive, were treated following the above procedure, thus yielding the corresponding 16,17-acetophenonides.

Example LXXVI

A solution of 500 mg. of compound No. 877 in 20 cc. of chloroform was treated with 1 g. of acetaldehyde and a few drops of 3 N perchloric acid and stirred at room temperautre for 2 hours. After diluting with water the chloroform layer was separated, washed with aqueous saturated sodium bicarbonate solution and then with water, the chloroform was distilled and the residue was purified by chromatography on neutral alumina, thus yielding 16α,17α-ethylidenedioxy-19-fluoro-Δ⁴-10α - pregnene-11β,21-diol-3,20-dione 21-acetate (Cpd. No. 906).

The compounds Nos. 878 to 890, inclusive, were treated following the latter procedure, thus producing the corresponding 16α,17α-ethylidenedioxy derivatives.

Example LXXVII

Into a solution of 3 g. of compound No. 573 in 150 cc. of glacial acetic acid was passed a slow stream of dry hydrogen chloride for 4 hours, while maintaining the temperature around 15° C. The mixture was then poured into ice-water, the precipitate collected, washed with water, dried and recrystallized from acetone-hexane to give a compound identical with compound No. 557.

Example LXXVIII

A mixture of 1 g. of 19-fluoro-Δ⁴-pregnene-11β,16α,17α,21-tetrol-3,20-dione 21-acetate (Cpd. No. 425), 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded 19-fluoro-Δ⁴-pregnene-11β,16α,17α,21-tetrol-3,20 - dione 21 - acetate-16,17-acetophenonide (Cpd. No. 907).

The compounds Nos. 426 to 438, inclusive, were treated following the above procedure, thus yielding the corresponding 16,17-acetophenonides.

Example LXXIX

A solution of 500 mg. of compound No. 425 in 20 cc. of chloroform was treated with 1 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding 16α,17α-ethylidenedioxy-19-fluoro-Δ⁴ - pregnene-11β,21-diol-3,20-dione 21-acetate (Cpd. No. 908).

The compounds Nos. 426 to 438, inclusive, were treated following the latter procedure, thus producing the corresponding 16α,17α-ethylidenedioxy derivatives.

I claim:
1. A compound of the following formula:

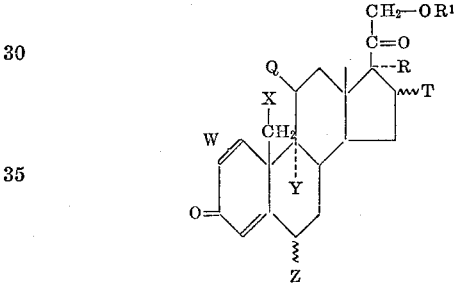

wherein X is a member of the group consisting of fluorine and chlorine; W is selected from the group consisting of a double bond and a saturated linkage between C–1 and C–2; Z is a member of the group consisting of hydrogen, α-methyl, β-methyl, α-fluorine, β-fluorine, α-chlorine and β-chlorine; Q is selected from the group consisting of β-hydroxyl and keto; Y is selected from the group consisting of hydrogen, fluorine and chlorine; R is a hydroxyl group; T is a member of the group consisting of hydrogen, α-hydroxy, α-hydrocarbon carboxylic acyloxy of less than 12 carbon atoms, α-methyl and β-methyl; R and T together represent the group

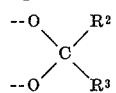

wherein R² and R³ are selected from the group consisting of hydrogen and a lower hydrocarbon residue of up to 8 carbon atoms; and R¹ is selected from the group consisting of hydrogen and a hydrocarbon carboxylic acyl group of less than 12 carbon atoms.

2. A compound of the following formula:

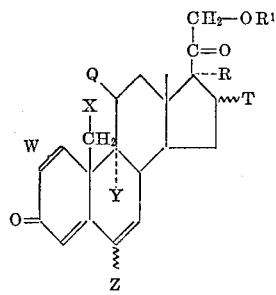

wherein X is a member of the group consisting of fluorine and chlorine; W is selected from the group consisting of a double bond and a saturated linkage between C–1 and C–2; Z is a member of the group consisting of hydrogen, methyl, fluorine, and chlorine; Q is selected from the group consisting of β-hydroxyl and keto; Y is selected from the group consisting of hydrogen, fluorine and chlorine; R is a hydroxyl gruop; T is a member of the group consisting of hydrogen, α-hydroxy, α-hydrocarbon carboxylic acyloxy of less than 12 carbon atoms, α-methyl and β-methyl; R and T together represent the group

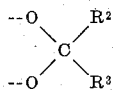

wherein R² and R³ are selected from the group consisting of hydrogen and a lower hydrocarbon residue of up to 8 carbon atoms, and R¹ is selected from the group consisting of hydrogen and a hydrocarbon carboxylic acyl group of less than 12 carbon atoms.

3. A compound of the following formula:

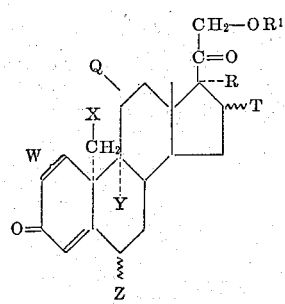

wherein X is a member of the group consisting of fluorine and chlorine; W is selected from the group consisting of a double bond and a saturated linkage between C–1 and C–2; Z is a member of the group consisting of hydrogen, α-methyl, β-methyl, α-fluorine, β-fluorine, α-chlorine and β-chlorine; Q is selected from the group consisting of β-hydroxyl and keto; Y is selected from the group consisting of hydrogen, fluorine and chlorine; R is a hydroxyl group; T is a member of the group consisting of hydrogen, α-hydroxy, α-hydrocarbon carboxylic acyloxy of less than 12 carbon atoms α-methyl and β-methyl; R and T together represent the group

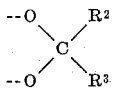

wherein R² and R³ are selected from the group consisting of hydrogen and a lower hydrocarbon residue of up to 8 carbons atoms; and R¹ is selected from the group consisting of hydrogen and a hydrocarbon carboxylic acyl group of less than 12 carbon atoms.

4. A compound of the following formula:

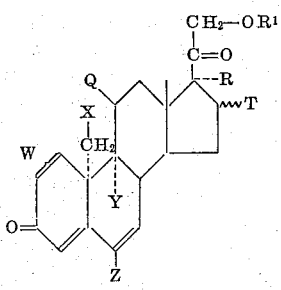

wherein X is a member of the group consisting of fluorine and chlorine; W is selected from the group consisting of a double bond and a saturated linkage between C–1 and C–2; Z is a member of the group consisting of hydrogen, methyl, fluorine, and chlorine; Q is selected from the group consisting of β-hydroxyl and keto; Y is selected from the group consisting of hydrogen, fluorine and chlorine; R is a hydroxyl group; T is a member of the group consisting of hydrogen, α-hydroxy, α-hydrocarbon carboxylic acyloxy of less than 12 carbon atoms, α-methyl and β-methyl; R and T together represent the group

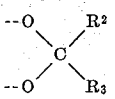

wherein R² and R³ are selected from the group consisting of hydrogen and a lower hydrocarbon residue of up to 8 carbon atoms; and R¹ is selected from the group consisting of hydrogen and a hydrocarbon carboxylic acyl group of less than 12 carbon atoms.

5. 19-halo-Δ⁴-10α-pregnene-11β,17α,21-triol-3,20 - dione 21-acetate wherein the halo is a halogen of atomic weight less than 36.

6. 19-halo-16-methyl-Δ⁴-10α-pregnene-11β,17α,21-triol-3,20-dione 21-acetate wherein halo is a halogen of atomic weight less than 36.

7. 19-halo-16α,17α-isopropylidendioxy-Δ⁴-10α - pregnene-11β,21-diol-3,20-dione 21-acetate wherein halo is a halogen of atomic weight less than 36.

8. 19-halo-16α,17α-isopropylidenedioxy-Δ⁴-10α - pregnen-21-ol-3,11,20-trione 21-acetate wherein halo is a halogen of atomic weight less than 36.

9. 19-halo-Δ⁴-10α-pregnene-17α,21-diol-3,11,20 - trione 21-acetate wherein halo is a halogen of atomic weight less than 36.

10. 19-halo-16-methyl-Δ⁴-10α-pregnene-17α,21-diol - 3, 11,20-trione 21-acetate wherein halo is a halogen of atomic weight less than 36.

11. 19-halo-6α-methyl-Δ⁴-10α-pregnene-17α,21-diol - 3, 11,20-trione wherein halo is a halogen of atomic weight less than 36.

12. 6α-fluoro-19-halo-Δ⁴-10α-pregnene-11β,17α,21-triol-3,20-dione wherein halo is a halogen of atomic weight less than 36.

13. 19-halo-Δ⁴-pregnene-11β,17α,21-triol-3,20-dione 21-acetate wherein halo is a halogen of atomic weight less than 36.

14. 19-halo-16-methyl-Δ⁴-pregnene-11β,17α,21-triol - 3, 20-dione 21-acetate wherein halo is a halogen of atomic weight less than 36.

15. 19-halo-16α,17α-isopropylidenedioxy-Δ⁴ - pregnene-11β,21-diol-3,20-dione 21-acetate wherein halo is a halogen of atomic weight less than 36.

16. 19 - halo - 16α,17α - isopropylidenedioxy - Δ⁴ - pregnene-21-ol-3,11,20-trione 21-acetate wherein halo is a halogen of atomic weight less than 36.

17. 19-halo-Δ⁴-pregnene-17α,21-diol-3,11,20-trione 21-acetate wherein halo is a halogen of atomic weight less than 36.

18. 19-halo-16-methyl-Δ⁴-pregnene-17α,21-diol-3,11,20-trione 21-acetate wherein halo is a halogen of atomic weight less than 36.

19. 19-halo-6α-methyl-Δ⁴-pregnene-17α,21-diol-3,11,20-trione wherein halo is a halogen of atomic weight less than 36.

20. 6α-fluoro-19-halo-Δ⁴-pregnene-11β,17α,21-triol-3,20-dione wherein halo is a halogen of atomic weight less than 36.

No references cited.

LEWIS GOTTS, *Primary Examiner.*